(12) United States Patent
Kusatsugu

(10) Patent No.: US 8,131,147 B2
(45) Date of Patent: Mar. 6, 2012

(54) MOVEMENT MECHANISM OF MOVER AND IMAGING DEVICE

(75) Inventor: Takashi Kusatsugu, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/825,584

(22) Filed: Jun. 29, 2010

(65) Prior Publication Data

US 2011/0002686 A1     Jan. 6, 2011

(30) Foreign Application Priority Data

Jul. 6, 2009 (JP) ................................ 2009-160138

(51) Int. Cl.
*G03B 15/03* (2006.01)
*G03B 17/02* (2006.01)

(52) U.S. Cl. ........................................ 396/535; 396/177

(58) Field of Classification Search .................. 396/177, 396/535

See application file for complete search history.

(56) References Cited

U.S. PATENT DOCUMENTS

| | | | |
|---|---|---|---|
| 6,351,609 B1 * | 2/2002 | Hosokawa et al. | 396/177 |
| 7,352,963 B2 * | 4/2008 | Hamano | 396/177 |
| 7,756,414 B2 * | 7/2010 | Deng | 396/177 |
| 7,778,541 B2 * | 8/2010 | Nishikawa | 396/177 |
| 2002/0001467 A1 * | 1/2002 | Tanaka et al. | 396/177 |
| 2002/0034383 A1 * | 3/2002 | Kobayashi | 396/177 |
| 2006/0153559 A1 * | 7/2006 | Kim | 396/177 |

FOREIGN PATENT DOCUMENTS

| | | |
|---|---|---|
| JP | 2001-005056 A | 1/2001 |
| JP | 2003-295286 A | 10/2003 |
| JP | 2005-258441 A | 9/2005 |
| JP | 2005-284091 A | 10/2005 |
| JP | 2005-345615 A | 12/2005 |
| JP | 2006-106139 A | 4/2006 |

* cited by examiner

*Primary Examiner* — Rodney Fuller
(74) *Attorney, Agent, or Firm* — Wolf, Greenfield & Sacks, P.C.

(57) ABSTRACT

A movement mechanism of a mover includes a base body disposed in an inner part of an outer case of an imaging device; a mover that is movable in a first movement direction with respect to the base body between a receiving position and a projecting position, and has a locked portion; a pressing spring that presses the mover from the receiving position toward the projecting position; a moving base capable of moving in a second movement direction between a lockable position to the base body and a lock release position; a lock lever that is supported by the moving base rotatably between a lock position and an unlock position; and a driver that is connected to the moving base and is a drive source for moving the moving base in the second movement direction.

4 Claims, 20 Drawing Sheets

MOVEMENT MECHANISM OF MOVER AND IMAGING DEVICE

BACKGROUND OF THE INVENTION

1. Field of the Invention

The present invention relates to a technical field for a movement mechanism of a mover and an imaging device. More specifically, the present invention relates to a technical field in which a movement direction of the mover and a movement direction of a moving base for supporting a lock lever are approximately perpendicular to each other to prevent an occurrence of a gap between the mover and an outer case in a receiving position received in an inner part of the outer case.

2. Description of the Related Art

In various imaging devices such as a video camera and a still camera, there is an imaging device that is equipped with a mover which is movable between a receiving position where it is received in a receiving concave portion formed in an outer case and a projecting position where it protrudes outside the outer case, for example, a light emitting block having a flash (for, example, see Japanese Unexamined Patent Application Publication No. 2003-295286).

In the imaging device described in the Japanese Unexamined Patent Application Publication No. 2003-295286, the mover is rotatably supported by the outer case and is pressed by a pressing spring (coil spring) from the receiving position to the projecting position. A locked portion (an engaging portion) is installed in the mover. In the inner part of the outer case, a lock lever, which rotates in the same direction as a rotation direction of the mover relative to the outer case, is installed and can rotate by a driving force of a plunger. The lock lever is pressed in a direction that locks the mover by a torsion coil spring.

In the imaging device, when the mover is pushed down from the projecting position toward the receiving position, the locked portion of the mover is engaged with the lock lever and is locked in the receiving position.

Furthermore, in the receiving position, when the lock lever rotates by the drive force of the plunger, the engagement of the lock lever with respect to the locked portion of the mover is released, whereby the mover moves from the receiving position to the projecting position due to the pressing force of the pressing spring.

SUMMARY OF THE INVENTION

However, in the imaging device described in Japanese Unexamined Patent Application Publication No. 2003-295286, because the rotation direction (movement direction) of the mover is the same as the lock release direction of the lock lever with respect to the mover, the degree of dimensional accuracy in the receiving position of the mover depends on the degree of dimensional accuracy of the plunger for rotating the lock lever.

Thus, when the degree of dimensional accuracy of the plunger is low, a gap is generated between the mover and an opening edge of a receiving concave portion formed in the outer case in the receiving position, which generates a defect in the mover with respect to the outer case.

In addition, in order to reduce the gap between the mover and the opening edge of the receiving concave portion in the receiving position, a high degree of dimensional accuracy regarding the plunger is necessary, which results in an according increase in production costs.

Thus, it is desirable to provide a movement mechanism of a mover and an imaging device in which the above-mentioned problem is overcome and occurrence of the gap between the mover and an outer case in a receiving position is prevented.

According to an embodiment of the present invention, there is provided a movement mechanism of a mover which includes a base body disposed in an inner part of an outer case of an imaging device; a mover that is movable in a first movement direction with respect to the base body between a receiving position where it is received in a receiving concave portion formed in the outer case and a projecting position where it protrudes outward from the outer case, and has a locked portion; a pressing spring that presses the mover from the receiving position toward the projecting position; a moving base capable of moving in a second movement direction between a lockable position to the base body and a lock release position; a lock lever that is supported by the moving base rotatably between a lock position and an unlock position, moves integrally with the moving base in the second movement direction, and is engaged with the locked portion of the mover, which has been moved to the receiving position in a state in which the moving base moves to the lockable position, in the lock position to lock the mover; and a driver that is connected to the moving base and is a drive source for moving the moving base in the second movement direction, wherein the moving base moves from the lockable position to the lock release position, whereby an engagement of the lock portion and the locked portion is released and the mover moves from the receiving position to the projecting position due to the pressing force of the pressing spring, and wherein the first movement direction of the mover is approximately perpendicular to the second movement direction of the moving base.

Thus, in the movement mechanism of the mover, the degree of the dimensional accuracy of the driver for moving the moving base which moves between the lockable position and the lock release position does not affect the degree of the positional accuracy of the mover relative to the outer case.

In the movement mechanism of the mover, it is desirable that the moving base is rotatably supported by the base body and the second movement direction of the moving base is made to be a rotation direction.

By making the second movement direction of the moving base be the rotation direction, the space that is necessary for the movement range of the moving base is reduced.

In the movement mechanism of the mover, it is desirable to install a cam sliding portion in the moving base and to install a cam portion in the mover. The cam portion slides with the cam sliding portion to move the moving base from the lock release position to the lockable position when moving from the receiving position toward the projecting position.

By installing the cam portion that slides with the cam sliding portion to move the moving base from the lock release position to the lockable position, when the mover moves to the projecting position, the moving base moves to the lockable position.

In the movement mechanism of the mover, it is desirable that in the cam sliding portion of the moving base, an elastic deformation portion capable of being elastically deformed in a direction toward and away from the cam portion is installed, and when the mover moves from the receiving position toward the projecting position, the elastic deformation portion of the cam sliding portion is elastically deformed in a direction where a pressing force is applied to the moving base in the movement direction from the lock release direction to the lockable position. By making the elastic deformation portion of the cam sliding portion be elastically deformed as described above, when the moving base moves from the lock release position to the lockable position, the pressing force toward the lockable position is applied by the elastic deformation portion.

In the movement mechanism of the mover, when the moving base moves to the lockable position, it is desirable that the cam sliding portion be separated from the cam portion.

When the moving base moves to the lockable position, by separating the moving base from the cam portion, in the rotation operation of the mover from the projecting position toward the receiving position, unnecessary load is not applied to the mover from the moving base.

In the above-mentioned movement mechanism of the mover, it is desirable to install a spring member that presses the moving base from the lockable position toward the lock release position and presses the lock lever from the unlock position toward the lock position.

By installing the spring member that presses the moving base and the lock lever in the above-mentioned predetermined direction, two spring members for specially pressing the moving base and the lock lever in a predetermined direction are unnecessary.

According to another embodiment of the present invention, there is provided an imaging device which includes an outer case with a receiving concave portion formed thereon; a base body disposed in an inner part of the outer case; a mover that is movable in a first movement direction relative to the base body between a receiving position where it is received in the receiving concave portion of the outer case and a projecting position where it protrudes outward from the outer case, and has a locked portion; a pressing spring for pressing the mover from the receiving position toward the projecting position; a moving base that is movable in a second movement direction between a lockable position to the base body and a lock release position; a lock lever that is supported by the moving base rotatably between a lock position and an unlock position, moves integrally with the moving base in the second movement direction, and is engaged with the locked portion of the mover, which has been moved to the receiving position in a state in which the moving base moves to the lockable position, in the lock position to lock the mover; and a driver that is connected to the moving base and is a drive source for moving the moving base in the second movement direction, wherein the moving base moves from the lockable position to the lock release position, whereby an engagement of the lock portion and the locked portion is released and the mover moves from the receiving position to the projecting position due to the pressing force of the pressing spring, an wherein the first movement direction of the mover is approximately perpendicular to the second movement direction of the moving base.

Thus, in the imaging device, the degree of dimensional accuracy of the driver for moving the moving base which moves between the lockable position and the lock release position does not affect the degree of positional accuracy of the mover relative to the outer case.

The movement mechanism of the mover according to an embodiment of the present invention includes a base body disposed in an inner part of an outer case of an imaging device; a mover that is movable in a first movement direction relative to the base body between a receiving position where it is received in the receiving concave portion formed on the outer case and a projecting position where it protrudes outward from the outer case, and has a locked portion; a pressing spring for pressing the mover from the receiving position toward the projecting position; a moving base that is movable in a second movement direction between a lockable position to the base body and a lock release position; a lock lever that is supported by the moving base rotatably between a lock position and an unlock position, moves integrally with the moving base in the second movement direction, and is engaged with the locked portion of the mover, which has been moved to the receiving position in a state in which the moving base moves to the lockable position, in the lock position to lock the mover; and a driver that is connected to the moving base and is a drive source for moving the moving base in the second movement direction, wherein the moving base moves from the lockable position to the lock release position, whereby an engagement of the lock portion and the locked portion is released and the mover moves from the receiving position to the projecting position due to the pressing force of the pressing spring, and wherein the first movement direction of the mover is approximately perpendicular to the second movement direction of the moving base.

Thus, a degree of positional accuracy of the mover in the receiving position relative to the outer case does not rely on a degree of dimensional accuracy of the driver for moving the moving base, and it is possible to set an over stroke of the receiving position side in a movement stroke of the mover in the first movement direction. As a result, a gap is not generated between the mover and an opening edge of the receiving concave portion in the receiving position and it is possible to prevent occurrence of defect in the mover with respect to the outer case.

Furthermore, a high degree of dimensional accuracy of a component such as the driver is not necessary to reduce the gap between the mover and the opening edge of the receiving concave portion in the receiving position and a reduction in production costs can be promoted accordingly.

According to a second embodiment of the invention, since the moving base is rotatably supported by the base body and the second movement direction of the moving base is made to be the rotation direction, it is possible to reduce the space that is necessary as the movement range of the moving base to promote the size reduction.

According to a third embodiment of the invention, the cam sliding portion is installed in the moving base, and in the mover, a cam portion is installed which, when moving from the receiving position toward the projecting position, slides with the cam sliding portion and moves the moving base from the lock release position to the lockable position.

Thus, the rotation operation of the mover from the projecting position to the receiving position can be rapidly performed without having to perform an operation for rotating the moving base from the lock release position to the lockable position in a state in which the mover has moved to the projecting position.

According to a fourth embodiment of the invention, in the cam sliding portion of the moving base, an elastic deformation portion capable of being elastically deformed in a direction toward or away from the cam portion is installed, and when the mover moves from the receiving position toward the projecting position, the elastic deformation portion of the cam sliding portion is elastically deformed in a direction where a pressing force is applied to the moving base in the movement direction from the lock release position to the lockable position.

Thus, it is possible to reliably rotate the moving base up to the lockable position.

According to a fifth embodiment of the invention, when the moving base moves to the lockable position, the cam sliding portion is separated from the cam portion.

Thus, in the rotation operation of the mover from the projecting position toward the receiving position, it is possible to smoothly perform the rotation operation of the mover from the projecting position toward the receiving position without applying unnecessary load to the mover from the moving base.

According to a sixth embodiment of the invention, a spring member is installed which presses the moving base from the lockable position toward the lock release position and presses the lock lever from the unlock position toward the lock position.

Thus, it is possible to promote the size reduction due to a reduction in the number of components and a saving of space without having to use two spring members for specially compressing the moving base and the lock lever in a predetermined direction.

An imaging device according to another embodiment of the present invention includes an outer case with a receiving concave portion formed thereon; a base body disposed in an inner part of the outer case; a mover that is movable in a first movement direction relative to the base body between a receiving position where it is received in the receiving concave portion of the outer case and a projecting position where it protrudes outward from the outer case, and has a locked portion; a pressing spring for pressing the mover from the receiving position toward the projecting position; a moving base that is movable in a second movement direction between a lockable position to the base body and a lock release position; a lock lever that is supported by the moving base rotatably between a lock position and an unlock position, moves integrally with the moving base in the second movement direction, and is engaged with the locked portion of the mover, which has been moved to the receiving position in a state in which the moving base moves to the lockable position, in the lock position to lock the mover; and a driver that is connected to the moving base and is a drive source for moving the moving base in the second movement direction, wherein the moving base moves from the lockable position to the lock release position, whereby an engagement of the lock portion and the locked portion is released and the mover moves from the receiving position to the projecting position due to the pressing force of the pressing spring, and wherein the first movement direction of the mover is approximately perpendicular to the second movement direction of the moving base.

Thus, a degree of positional accuracy of the mover in the receiving position relative to the outer case does not rely on a degree of dimensional accuracy of the driver for moving the moving base, and it is possible to set an over stroke of the receiving position side in a movement stroke of the mover in the first movement direction. As a result, a gap is not generated between the mover and an opening edge of the receiving concave portion in the receiving position and it is possible to prevent occurrence of defect in the mover with respect to the outer case.

Furthermore, a high degree of dimensional accuracy of a component such as the driver is not necessary to reduce the gap between the mover and the opening edge of the receiving concave portion in the receiving position, and a reduction in production costs of the imaging device can be promoted accordingly.

DESCRIPTION OF THE PREFERRED EMBODIMENTS

Hereinafter, embodiments of the invention will be described based on the attached drawings.

The embodiments described below relate to ones in which an imaging device of the present invention is applied to a digital camera and a movement mechanism of a mover of the present is applied to a movement mechanism of a mover included in the digital camera.

Furthermore, application scope of the present invention is not limited to the digital camera and the movement mechanism of the mover included in the digital camera. The present invention can be widely applied to, for example, other imaging devices such as a video camera and a silver halide camera, an imaging device attached to a mobile phone, various imaging devices attached to an information processing device such as a personal computer, a communication terminal device and game equipment, and a movement mechanism of a mover included in the various imaging devices.

In the following description, a front and rear direction, an up and down direction and a left and right direction are indicated on the basis of a direction seen from a photographer (a user) when photographing with a still camera. Thus, a subject side is set to be a front side and a photographer side is set to be a rear side.

In addition, the front and rear direction, the up and down direction, and the left and right direction described below are just for convenience of explanation, and in relation to the implementation of the present invention, the present invention is not limited thereto.

Overall Structure

Figure 1:
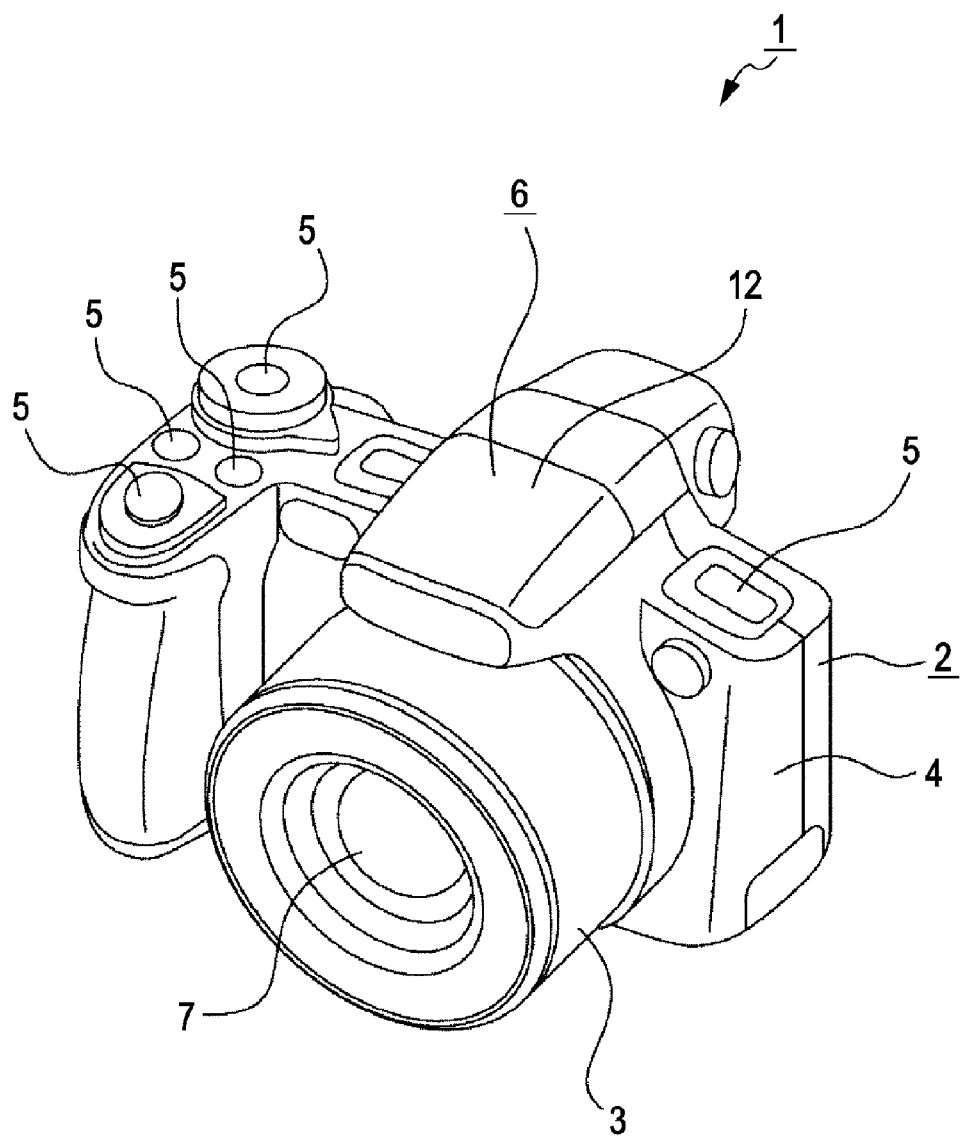
FIG. 1 illustrates an embodiment of the present invention together with FIGS. 2 to 20 and is a schematic perspective view of an imaging device.
Figure 2:
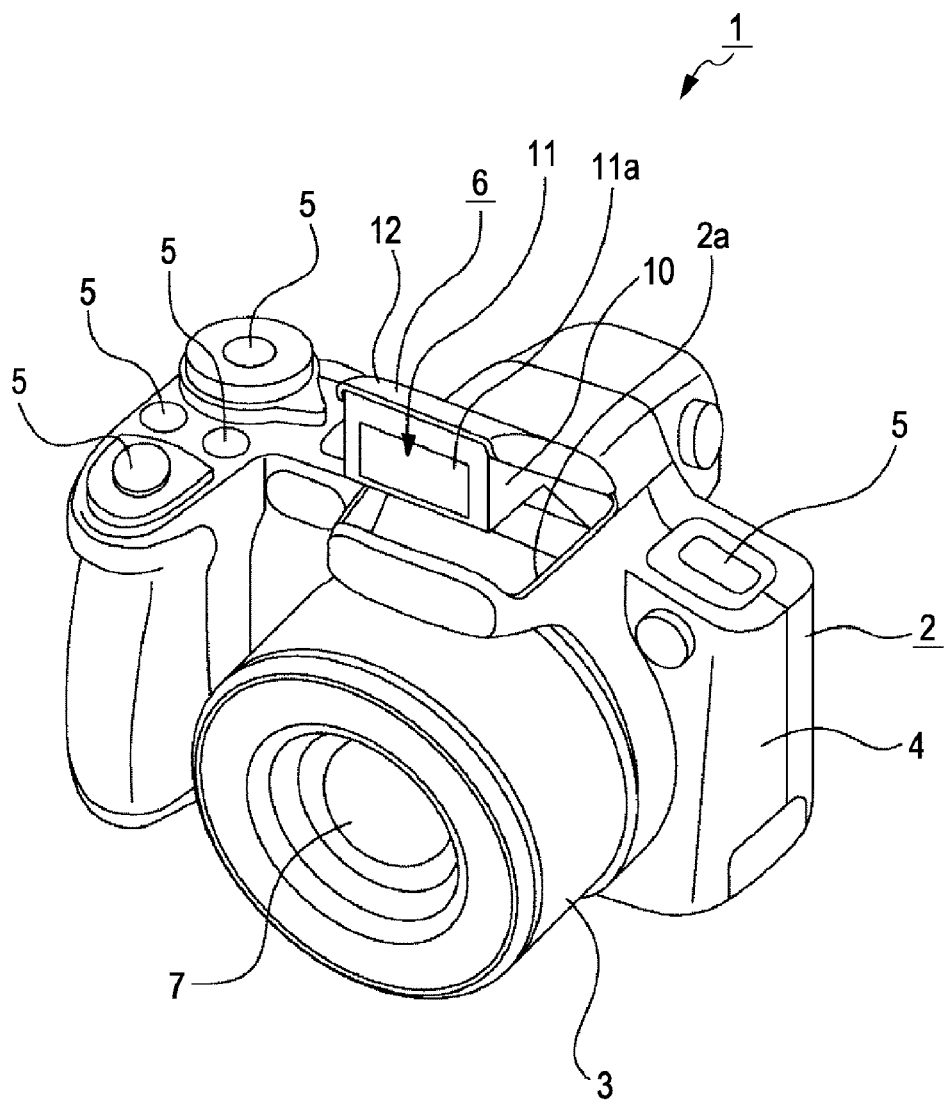
FIG. 2 is a schematic perspective view of an imaging device that illustrates a state in which a mover is in a projecting position.

An imaging device (a digital camera) 1 includes a device main body 2 and a lens mirror barrel portion 3 installed at the front surface of the device main body 2 (see FIGS. 1 and 2). Lens mirror barrel portion 3 is an exchange lens that can be exchanged with respect to the device main body 2 or an all-in-one lens mirror barrel integrally installed in the device main body 2.

The device main body 2 is configured such that each necessary portion is disposed inside and outside an outer case 4 and various operating portions 5, 5, . . . such as an imaging instrument and a zoom screw are disposed on the surface thereof. On the rear surface of the device main body 2, various operating portions (not shown) and a display panel (not shown) or the like are disposed.

In the upper portion of the center portion of the device main body 2 in the left and right direction, a receiving concave portion 2a opened to the upper side is formed (see FIG. 2). A mover 6 is received in the receiving concave portion 2. In the mover 6, for example, a light emitting unit described later having a flash is installed. The mover 6 can rotate relative to the outer case 4 and rotates between a receiving position (see FIG. 1) where it is received in the receiving concave portion 2a and a projecting position (see FIG. 2) where it protrudes outward from the receiving concave portion 2a.

An imaging lens 7 is disposed at the front end of the lens mirror barrel portion 3.

Structure of Movement Mechanism

A movement mechanism 8 is disposed in the device main body 2 (see FIGS. 3 to 6). The movement mechanism 8 includes the mover 6 and a base body 9.

The mover 6 has a flash case 10, a light emitting unit 11 and a top cover 12.

Figure 3:
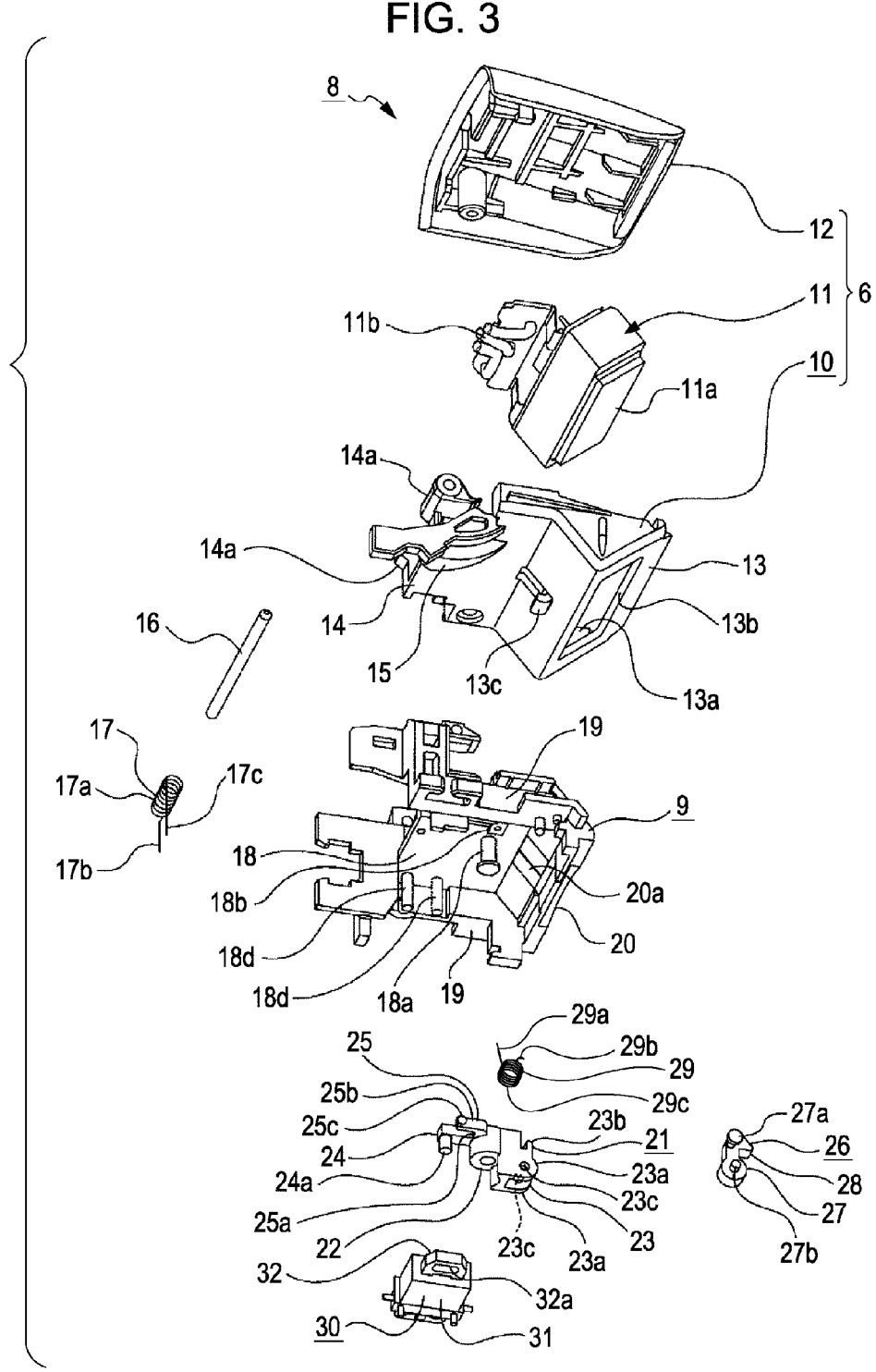
FIG. 3 is a disassembled perspective view of a movement mechanism.

The flash case 10 is configured so that a case portion 13 is formed integrally with a protrusion-shaped portion 14 protruding rearward from the rear end portion of the case portion 13 (see FIG. 3).

The case portion 13 is formed in the shape of a triangular column with a transverse length and has an installation concave portion 13a therein. A rectangular installation opening 13b is formed on a surface facing the front side of the case portion 13, and the installation concave portion 13a communicates with the installation opening 13b. On a surface facing the lower part side of the case portion 13, a locked portion 13c protruding downward is installed. The locked portion 13c is, for example, formed in the shape of a circular column with a transverse length.

Figure 4:
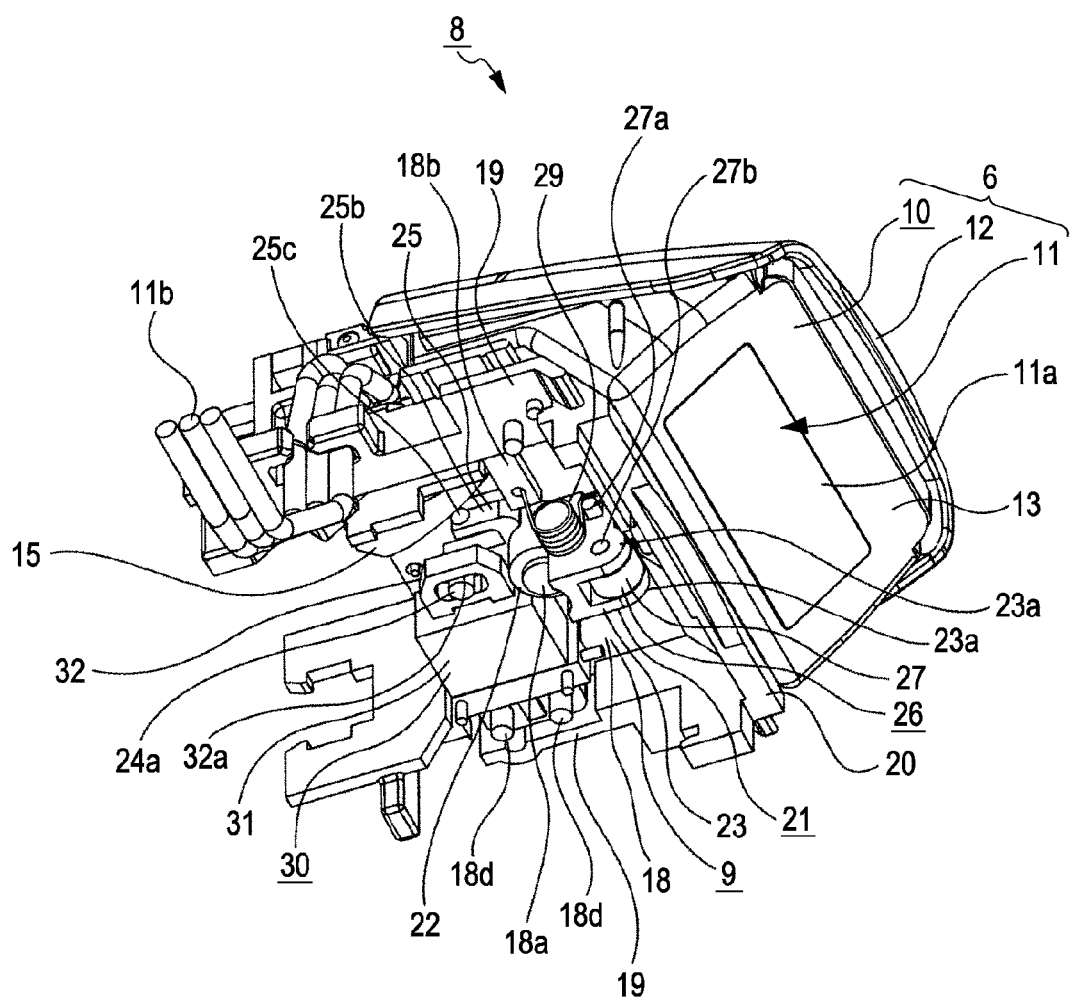
FIG. 4 is an enlarged perspective view of a movement mechanism.
Figure 5:
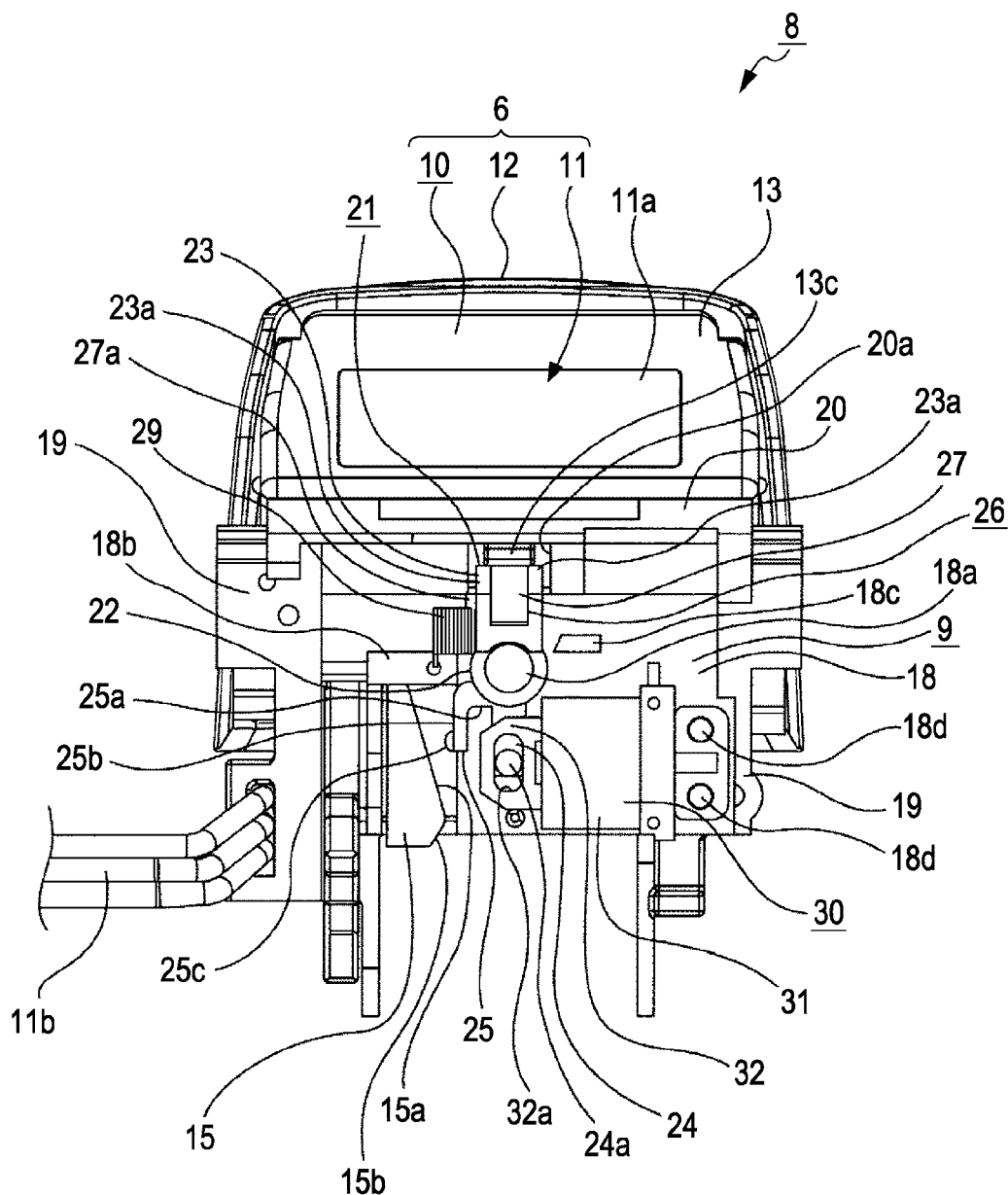
FIG. 5 is an enlarged bottom view of a movement mechanism.

The protrusion-shaped portion 14 is formed in the shape of a substantial pate facing substantially in the up and down direction, and has shaft support portions 14a, 14a with transverse lengths installed separately in the left and light direction at the rear end portion thereof. At the right end portion on the lower surface of the protrusion-shaped portion 14, a cam portion 15 protruding downward is installed (see FIGS. 3 to 5). As shown in FIGS. 4 and 5, on the cam portion 15, a first cam surface 15a which inclines so as to displace to the left side as it goes to the rear part, and a second cam surface 15b, which inclines so as to displace to the right side as it goes to the rear part, are formed. The first cam surface 15a and the second cam surface 15b are formed successively in the front and rear direction, and the first cam surface 15a is larger than the second cam surface 15b in the front and rear direction.

The light emitting unit 11 has a light emitting portion 11a and a cord 11b connected to the light emitting portion 11a. The light emitting unit 11 is configured so that the light emitting portion 11a is inserted into the installation concave portion 13a formed on the case portion 13 of the flash case 10 and the front end portion thereof is disposed at the installation opening 13b. The light emitting unit 11 is configured so that the cord 11b is connected to a drive circuit (not shown) disposed at the inner part of the outer case 4.

The top cover 12 is formed in the shape of a substantial plate substantially facing the up and down direction and is mounted on the flash case 10 in a state in which the light emitting unit 11 is disposed in the flash case 10. The mover 6 is configured by mounting the top cover 12 on the protrusion-shaped portion 14 of the flash case 10 in a state in which the light emitting unit 11 is disposed in the flash case 10.

A support shaft 16 is installed in the shaft support portions 14a, 14a installed at the protrusion-shaped portion 14 of the flash case 10 (see FIG. 3), and both ends of the support shaft 16 in the axial direction are respectively supported by a bearing portion (not shown) installed at the outer case 4. Thus, the mover 6 is rotatably supported by the outer case 4 via the support shaft 16.

As described above, the mover 6 rotates the receiving position (see FIG. 1) where it is received in the receiving concave portion 2a and the projecting position (see FIG. 2) where it protrudes outward from the receiving concave portion 2a. The mover 6 rotates in a vertical plane so as to move approximately in the up and down direction and the rotation direction of the mover 6 becomes a first movement direction.

A pressing spring 17 which is a torsion coil spring, for example, is supported by the support shaft 16 (see FIG. 3). The pressing spring 17 is configured so that the coil portion 17a is supported by the support shaft 16, one end portion 17b thereof is connected to a spring support portion (not shown) installed at the outer case 4, and another end portion 17c thereof is connected to a spring support portion (not shown) installed at the protrusion-shaped portion 14 of the flash case 10. Thus, the mover 6 is pressed from the receiving position toward the projecting position due to the pressing force of the pressing spring 17.

As shown in FIG. 3, the base body 9 has a base surface portion 18 facing the up and down direction, side surface portions 19 and 19 respectively protruding downward from both left and right side edges of the base surface portion 18, and a front surface portion 20 protruding downward to incline forward from the front edge of the base surface portion 18.

At the lower surface of the base surface portion 18, a support shaft 18a protruding downward is installed approximately at the center portion thereof, and a stopper protrusion portion 18b protruding downward and a spring protrusion portion 18c are installed at both the left and light sides of the support shaft 18a (see FIGS. 4 and 5). At the left end portion on the lower surface of the base surface portion 18, installation shafts 18d and 18d protruding downward are installed.

Figure 6:
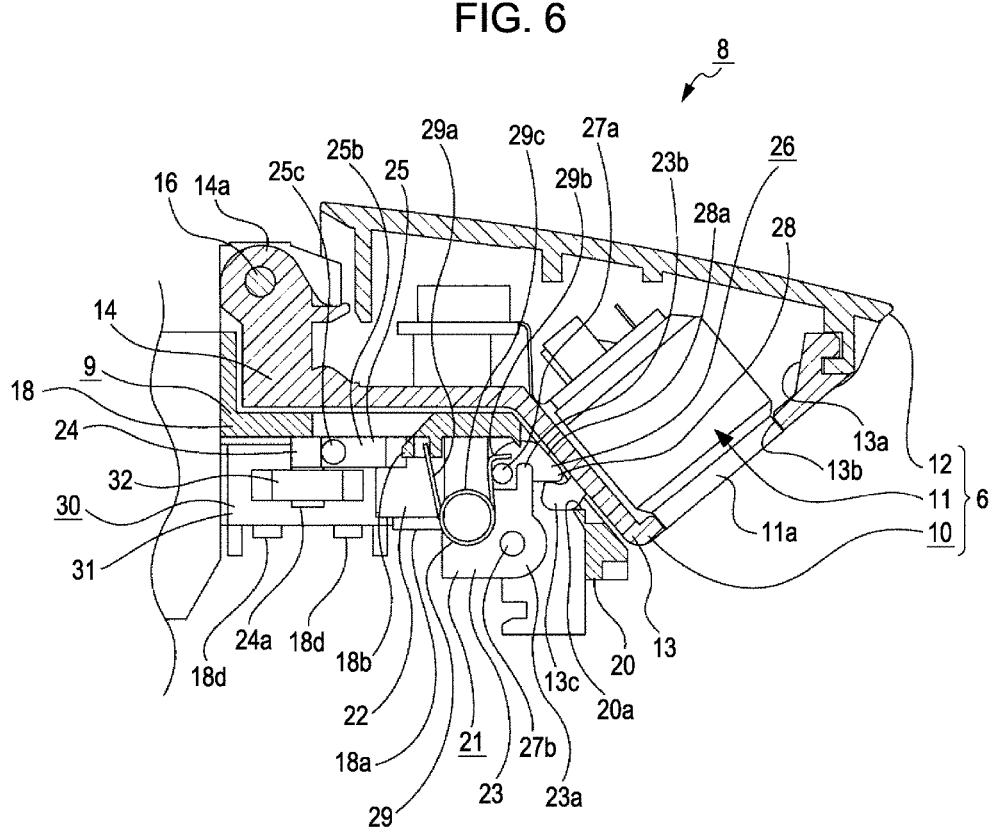
FIG. 6 is an enlarged sectional view of a movement mechanism.

At the center portion of the front surface portion 20 in the left and right direction, an inserting opening 20a is formed (see FIGS. 3 and 6).

A moving base 21 is rotatably supported by the support shaft 18a of the base surface portion 18 (see FIGS. 4 and 6). The moving base 21 rotates in the horizontal plane by using the support shaft 18a as a fulcrum, and the rotation direction of the moving base 21 becomes a second movement direction. The moving base 21 rotates between a lockable position which is one movement end in the rotation direction and a lock release position which is another movement end, and a position, which abuts the stopper protrusion portion 18c installed at the base body 9 and the rotation operation is restricted, becomes the lock release position.

As shown in FIGS. 3 to 5, the moving base 21 has a cylindrical supported shaft portion 22 supported by the support shaft 18a, a lever support portion 23 installed at the front side of the supported shaft portion 22, a connection protrusion portion 24 protruding rearward from the upper end portion in the rear surface of the supported shaft portion 22, and a cam sliding portion 25 protruding from the supported shaft portion 22 to the right side.

In the lever support portion 23, support surface portions 23a and 23a situated separately in the left and right directions are installed, at the front end portion of one support surface portion 23a, a restriction protrusion portion 23b protruding upward is installed, and at a position nearby the lower ends of the support surface portions 23a and 23a, support openings 23c and 23c penetrated left and right are formed respectively.

At the rear end portion of the connection protrusion portion 24, a connection shaft 24a protruding downward is installed.

The cam sliding portion 25 has a base portion 25a protruding from the supported shaft portion 22 to the right side and an elastic deformation portion 25b protruding rearward from the right end portion of the base portion 25a, and a sliding protrusion portion 25c having an approximately semicircular shape is installed at the rear end portion of the elastic deformation portion 25b. The cam sliding portion 25 is configured so that the elastic deformation portion 25b can be deformed elastically in a direction toward and away from the connection protrusion portion 24 with respect to the base portion 25a.

A lock lever 26 is rotatably supported by the lever support portion 23 of the moving base 21. The lock lever 26 is configured so that a supported portion 27 extending approximately in the up and down direction is formed integrally with an engaging protrusion portion 28 formed so as to bend forward from the upper end of the supported portion 27. At the supported portion 27, a spring support shaft portion 27a protruding to the right side is installed at the upper end portion thereof, and supported pins 27b and 27b protruding to the left and right sides are installed at a position near the lower end, respectively. An upper surface in the front end portion of the engaging protrusion portion 28 is formed as an inclined surface 28a which inclines so as to be displaced to the lower part as it goes forward.

The lock lever 26 is configured so that the supported pins 27b and 27b of the supported portion 27 are respectively inserted into the support openings 23c and 23c of the lever support portion 23 from the inner side and are rotatably supported by the moving base 21 (see FIGS. 4 to 6). In the state in which lock lever 26 is supported by the moving base 21, the front end portion of the engaging protrusion portion 28 is situated at the front side from the lever support portion 23 and the front end portion of the spring support shaft portion 27a is situated at the right side from the right lever support portion 23.

The lock lever 26 is configured so that the spring support shaft portion 27a is engaged with the restriction protrusion portion 23b of the lever support portion 23, whereby the rotation operation is restricted in a direction where the engaging protrusion portion 28 moves approximately forward, and the rotation position restricted by the restriction protrusion portion 23b becomes the lock position. The lock lever 26 rotates between the lock position and the unlock position where the engaging protrusion portion 28 is situated rearward from the lock position.

As described above, in the state in which the moving base 21 is supported by the support shaft 18a of the base body 9, a spring member 29 is supported between the base body 9 and the lock lever 26. The spring member 29 is, for example, a torsion coil spring, one end portion 29a thereof is supported by the spring support protrusion portion 18b of the base portion 9, another end portion 29b thereof is supported by the spring supports shaft portion 27a of the lock lever 26, and one end of the coil portion 29c comes in contact with the outer surface of one support surface portion 23a of the moving base 21.

Thus, the pressing force of the spring member 29 presses the moving base 21 from the lockable position toward the lock release position and presses the lock lever 26 from the unlock position toward the lock position.

Since the spring member 29 has a function of pressing the moving base 21 and the lock lever 26 in a predetermined direction respectively as described above, it is possible to promote the size reduction of the imaging device 1 due to a reduction in the number of components and a saving of space without having to use two spring members for specially pressing the moving base 21 and the lock lever 26 in the predetermined direction.

A plunger 30 is mounted on the installation shafts 18d and 18d of the base body 9. The plunger 30 functions as a driver, which is a drive source for rotating and driving the moving base 21, and includes a main body 31 and a drive portion 32 that moves in the left and right direction relative to the main body 31. A connection opening 32a is formed in the drive portion 32.

One end portion of the main body 31 of the plunger 30 is mounted on the installation shafts 18d and 18d (see FIGS. 4 and 5). The plunger 30 is a so-called self maintenance type plunger in which a permanent magnet and a coil (not shown) disposed in the inner portion of the main body 31 is included, the drive portion 32 is adsorbed by the permanent magnet when an electric current is not applied and the adsorption state of the drive portion 32 due to the permanent magnet is released by applying the electric current.

The plunger 30 is connected to the moving base 21 by inserting the connection shaft 24a installed in the connection protrusion portion 24 into the connection opening 32a of the drive portion 32.

When an electric current is not applied to the plunger 30, the drive portion 32 is adsorbed by the permanent magnet and the moving base 21 resists against the pressing force of the spring member 29 and is held in the lockable position (see FIG. 5). When an electric current is applied to the plunger 30, since the adsorption state of the drive portion 32 due to the permanent magnet is released, the drive portion 32 largely protrudes from the main body portion 31, the moving base 21 rotates due to the pressing force of the spring member 29, and the lever support portion 23 is pressed to the stopper protrusion portion 18c and is held in the lock release position.

Operation of Movement Mechanism

Hereinafter, the operation of the movement mechanism 8 will be described (see FIGS. 7 to 20).

Figure 7:
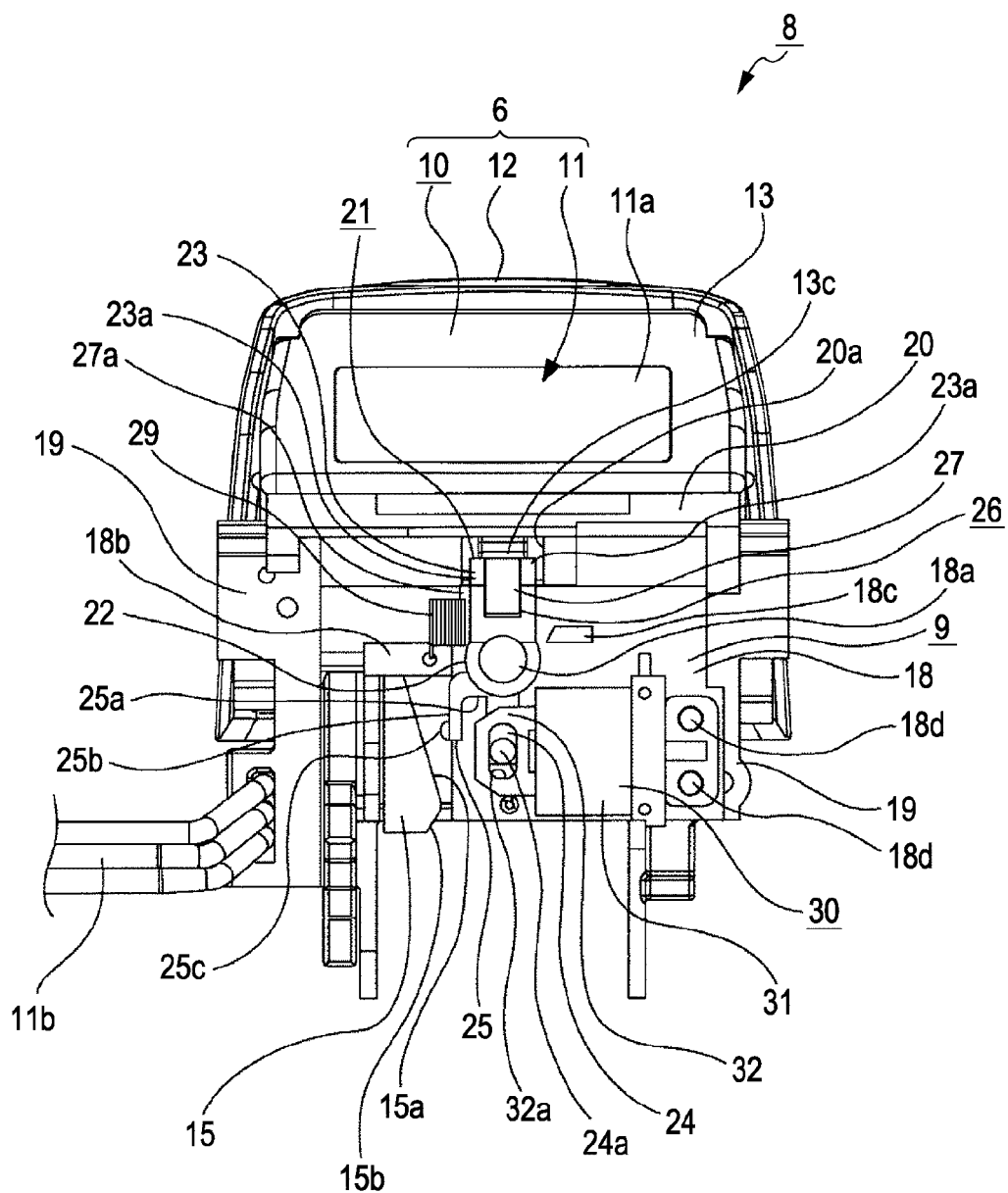
FIG. 7 illustrates an operation of a movement mechanism together with FIGS. 8 to 20 and is an enlarged bottom view that illustrates a state in which a mover is in a receiving position.
Figure 8:
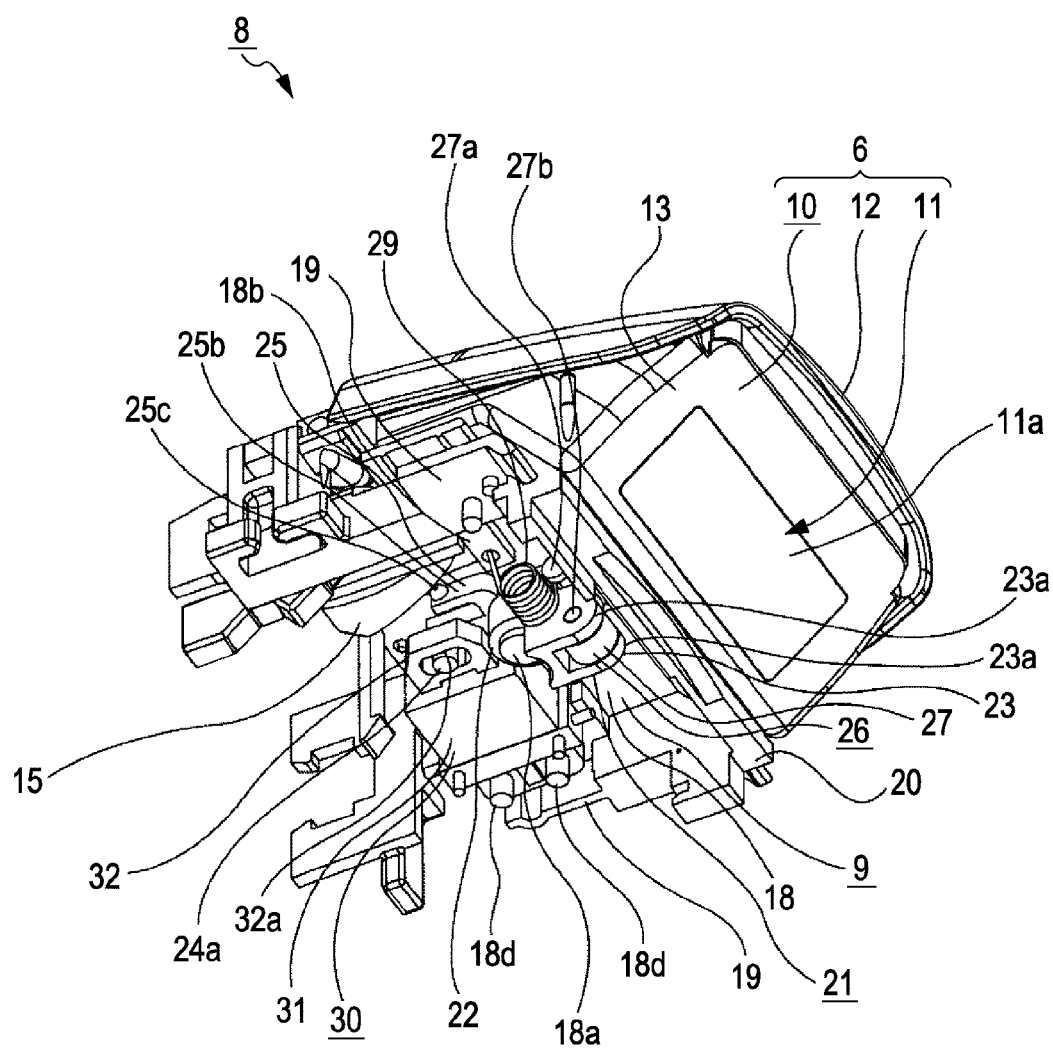
FIG. 8 is an enlarged perspective view that illustrates a state in which a mover is in a receiving position.

First of all, a state in which the mover 6 is locked in the receiving position will be described (see FIGS. 7 and 8).

When the mover 6 is in the receiving position, an electric current is not applied to the plunger 30, the drive portion 32 is adsorbed by the permanent magnet, and the moving base 21 is held in the lockable position. At this time, the locked portion 13c of the mover 6 is inserted into the inserting opening 20a formed in the front surface portion 20 of the base body 9 from the front side thereof.

In a state in which moving base 21 is held in the lockable position, the lock lever 26 is held in the lock position due to the pressing force of the pressing spring 17, the engaging protrusion portion 28 is engaged with the locked portion 13c installed in the flash case 10 of the mover 6 that is in the receiving position, and the mover 6 is locked in the receiving position.

In a state in which the mover 6 is locked in the receiving position and the moving base 21 is held in the lockable position, the sliding protrusion portion 25c of the cam sliding portion 25 is situated separately from the cam portion 15 of the flash case 10.

Next, the description will be given to the operation in which mover 6 moves from the receiving position to the projecting position (see FIGS. 9 to 16).

In a state in which the mover 6 is locked in the receiving position, when the predetermined operating portion 5 is operated, an electric current is applied to the plunger 30. The application of electric current to the plunger 30 is performed for a short time, e.g., about 0.1 seconds.

Figure 9:
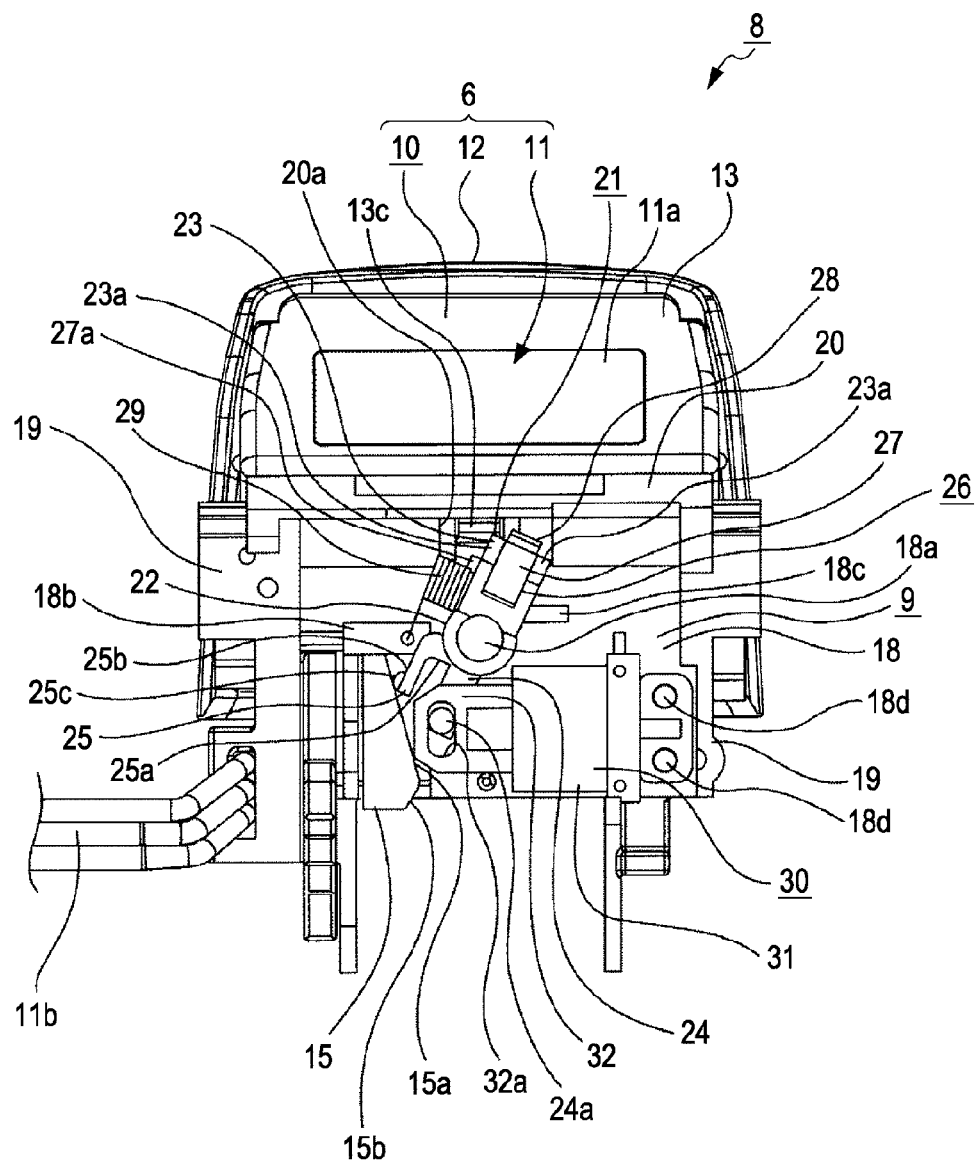
FIG. 9 is an enlarged bottom view that illustrates a state in which a lock of a lock lever with respect to a mover is released.
Figure 10:
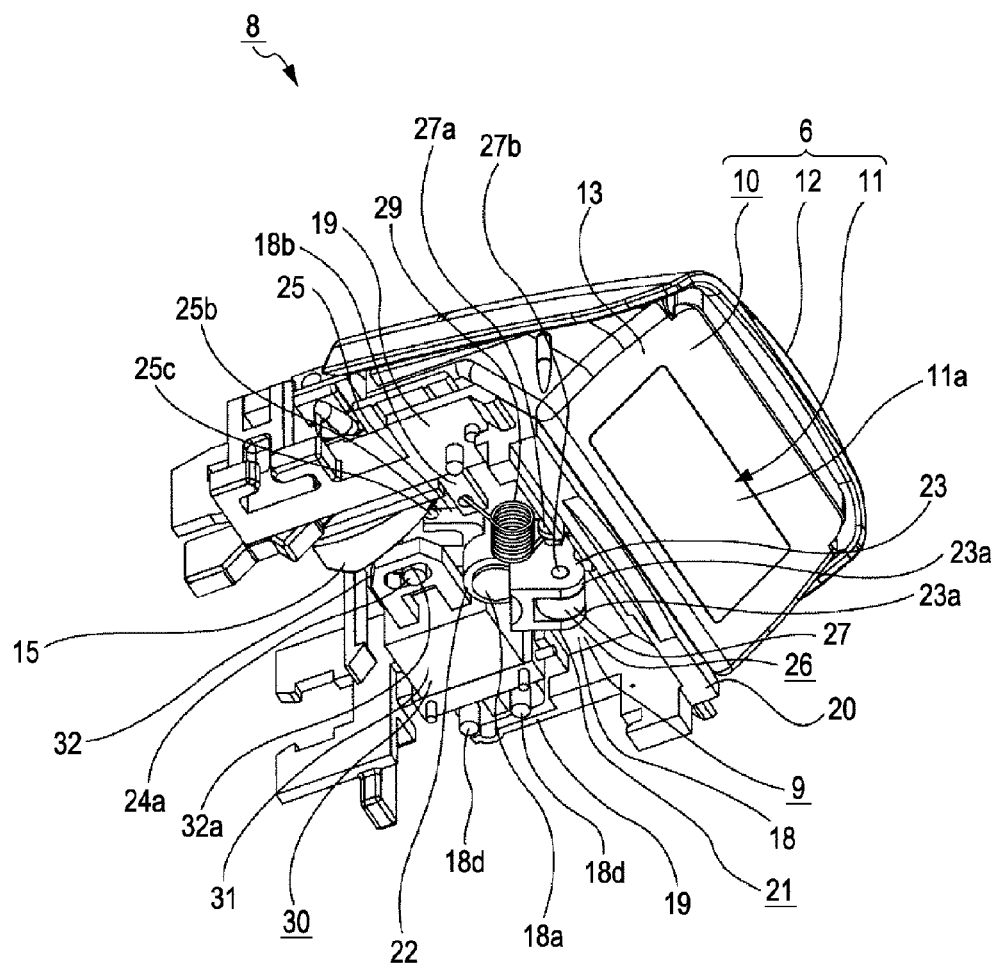
FIG. 10 is an enlarged perspective view that illustrates a state in which a lock of a lock lever with respect to a mover is released.

When the electric current is applied to the plunger 30, the adsorption state of the drive portion 32 due to the permanent magnet is released, and the moving base 21 rotates from the lockable position to the lock release position due to the pressing force of the spring member 29 (see FIGS. 9 and 10). Thus, plunger 30 enters a state in which the drive portion 32 greatly protrudes from the main body 31. At this time, the lock lever 26 moves along with the rotation operation of the moving base 21 in a state being held in the lock position.

When the moving base 21 rotates to the lock release position, the sliding protrusion portion 25c of the cam sliding portion 25 is engaged with the front end portion of the first cam surface 15a in the cam portion 15 installed in the mover 6.

The moving base 21 rotates toward the lock release position, so that the engaging state of the engaging protrusion portion 28 of the lock lever 26 and the locked portion 13c of the mover 6 is released and the lock of the mover 6 formed by the lock lever 26 is released.

Figure 11:
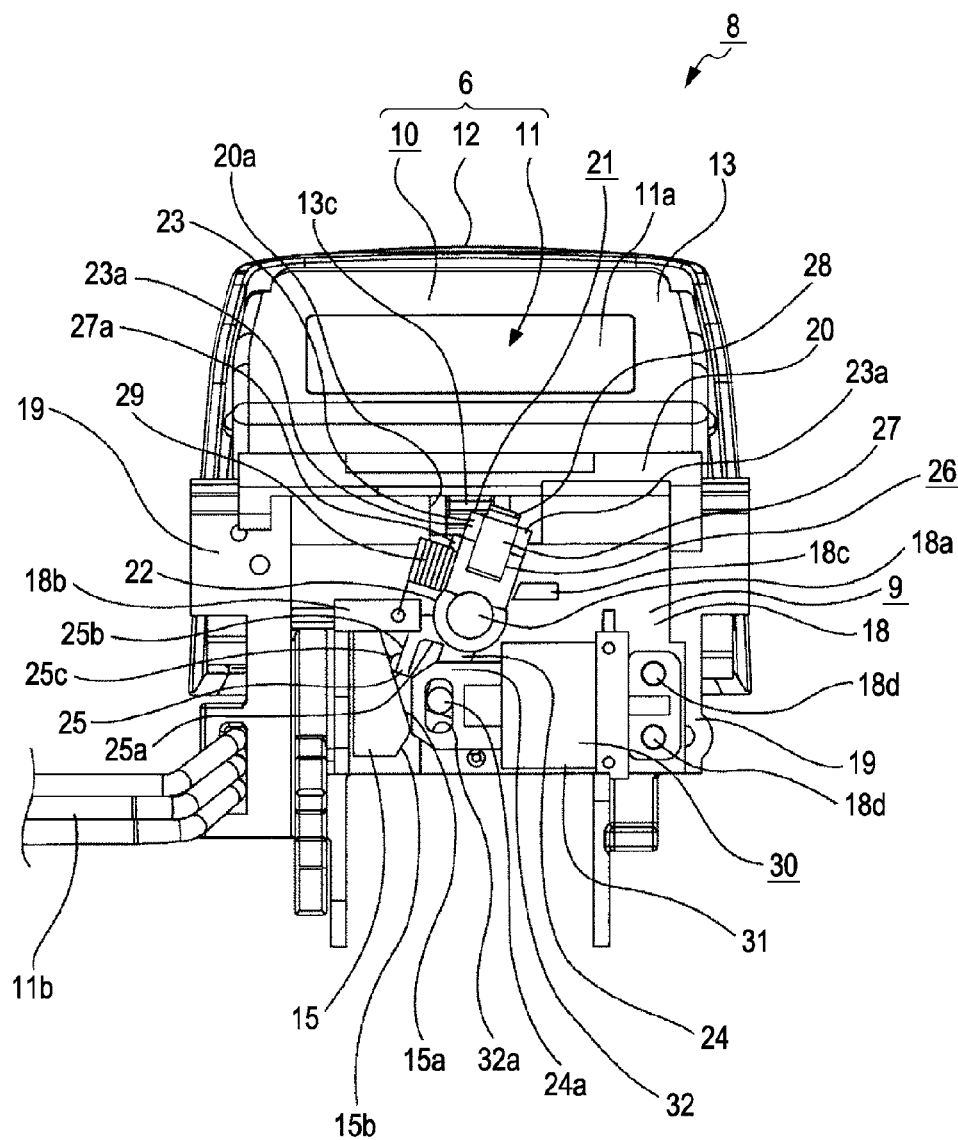
FIG. 11 is an enlarged bottom view that illustrates a state in which a mover rotates from a receiving position toward a projecting position and a cam sliding portion abuts on a first cam surface of a cam portion.
Figure 12:
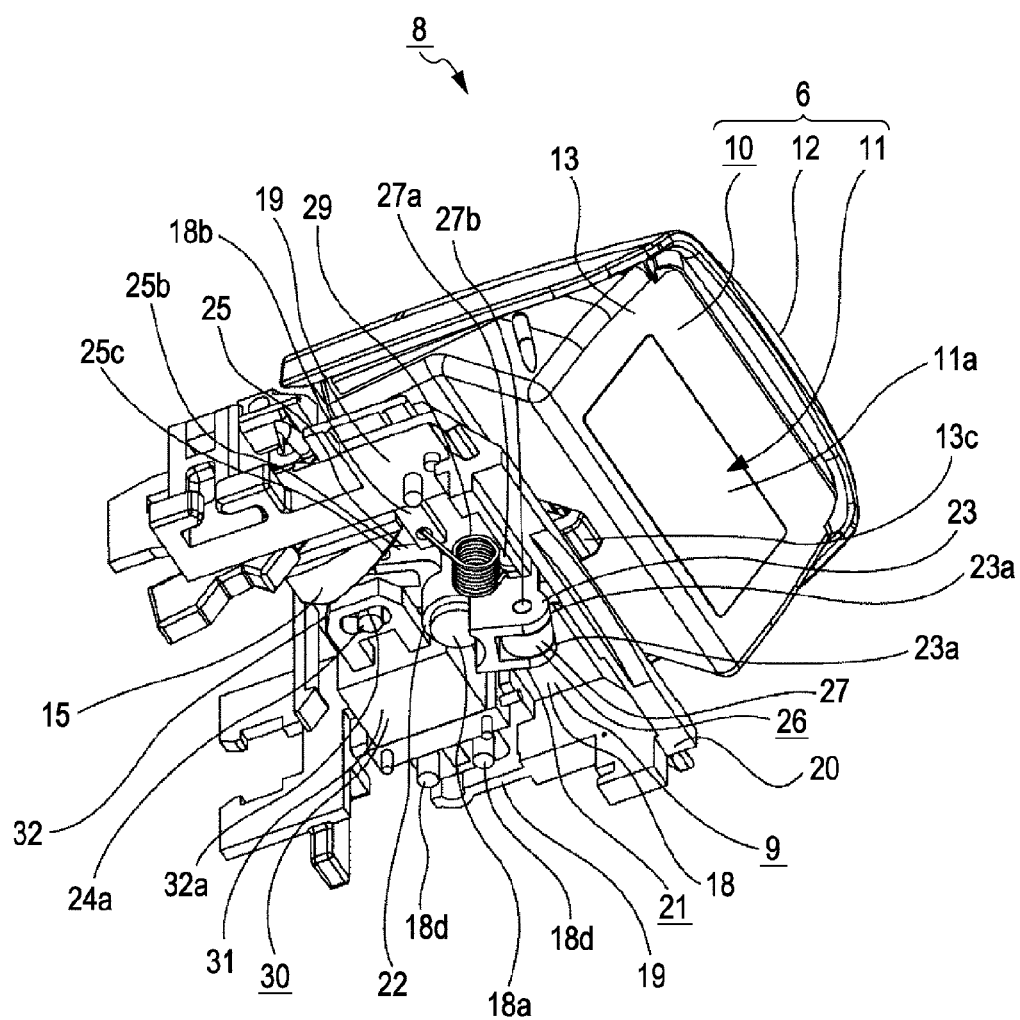
FIG. 12 is an enlarged perspective view that illustrates a state in which a mover rotates from a receiving position toward a projecting position and a cam sliding portion abuts on a first cam surface of a cam portion.

When the lock of the mover 6 formed by the lock lever 26 is released, the mover 6 rotates from the receiving position toward the projecting position by means of the pressing force of the pressing spring 17 (see FIGS. 11 and 12).

When the mover 6 rotates toward the projecting position, the sliding protrusion portion 25c of the cam sliding portion 25 slides on the first cam surface 15a of the cam portion 15 toward the second cam surface 15b, and the moving base 21 resists against the pressing force of the spring member 29 and rotates integrally with the lock lever 26 from the lock release position toward the lockable position.

Figure 13:
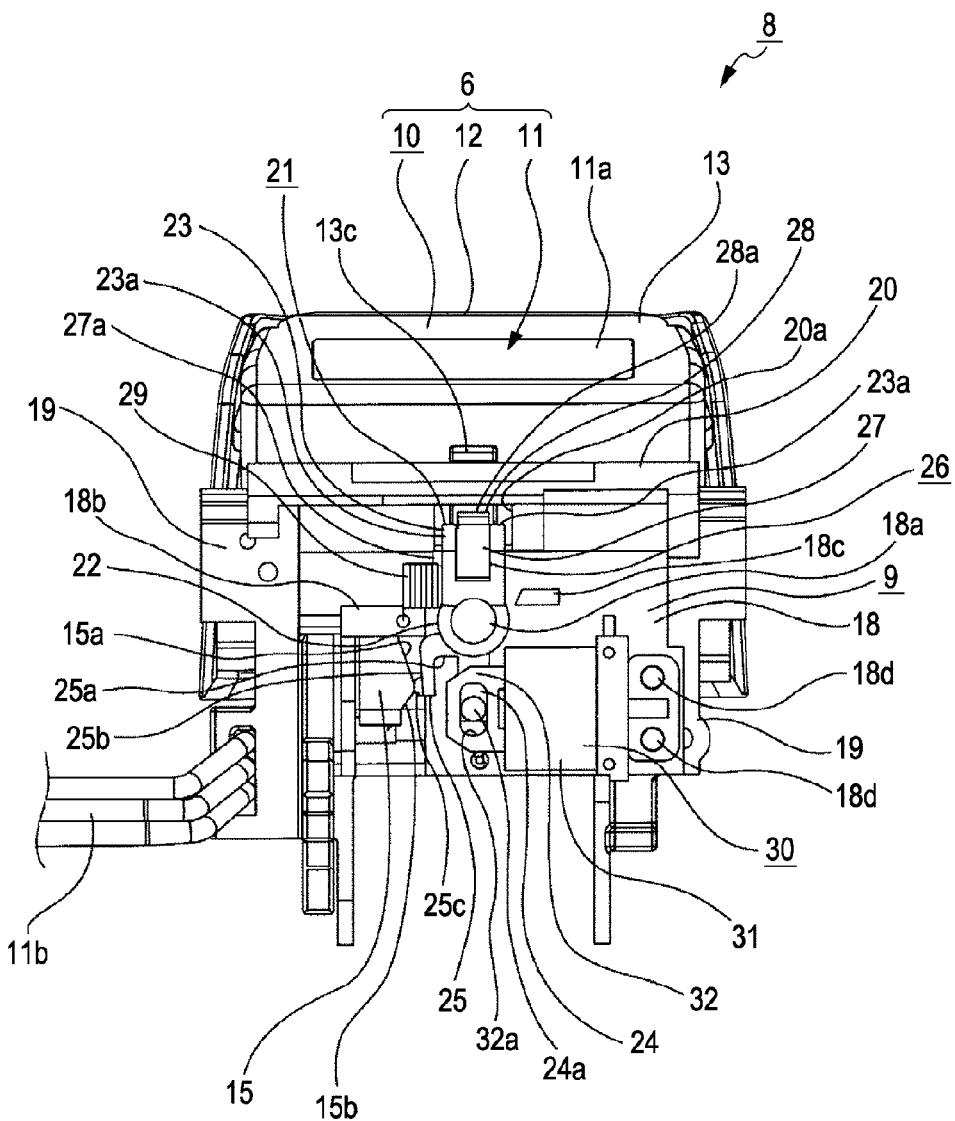
FIG. 13 is an enlarged bottom view that illustrates a state in which a mover rotates toward a projecting position continuously from FIG. 11 and a cam sliding portion abuts on a consecutive portion of a first cam surface and a second cam surface of a cam portion.
Figure 14:
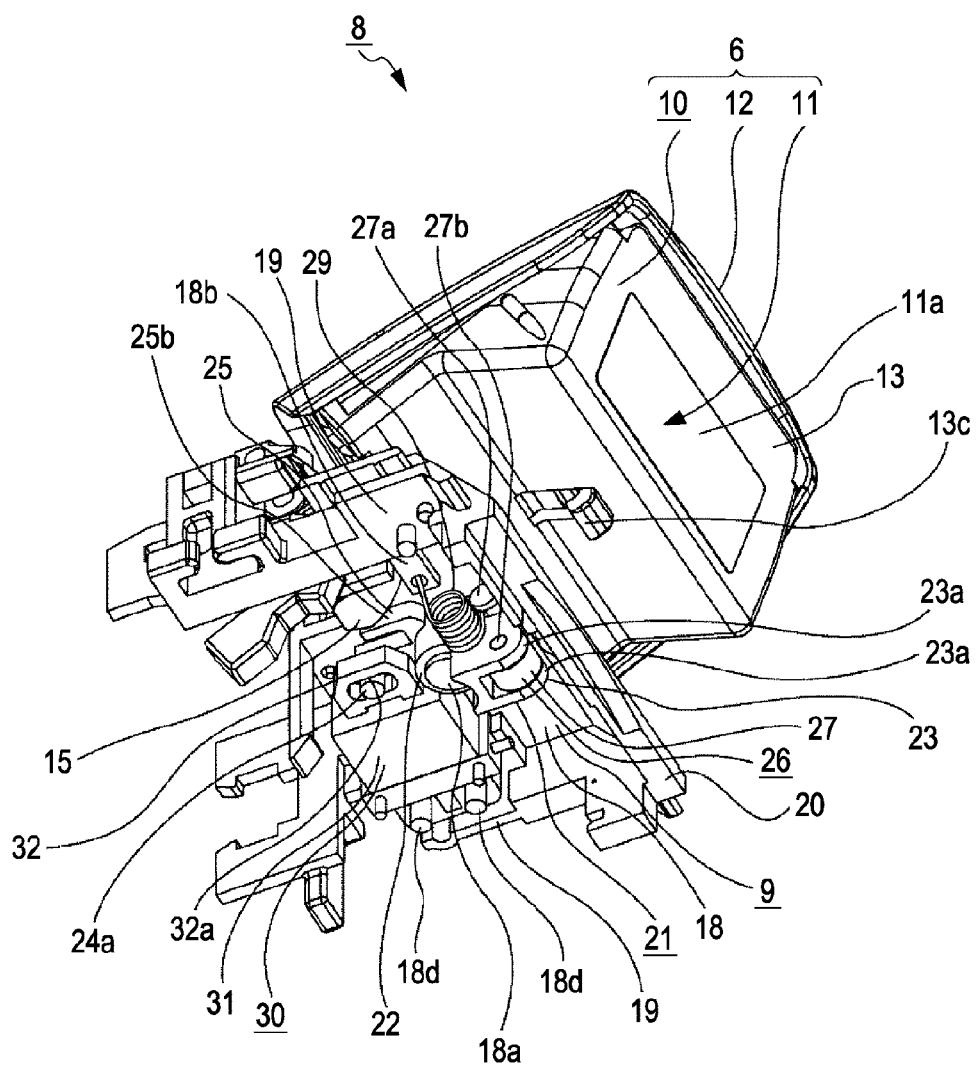
FIG. 14 is an enlarged perspective view that illustrates a state in which a mover rotates toward a projecting position continuously from FIG. 12 and a cam sliding portion abuts on a consecutive portion of a first cam surface and a second cam surface of a cam portion.
Figure 15:
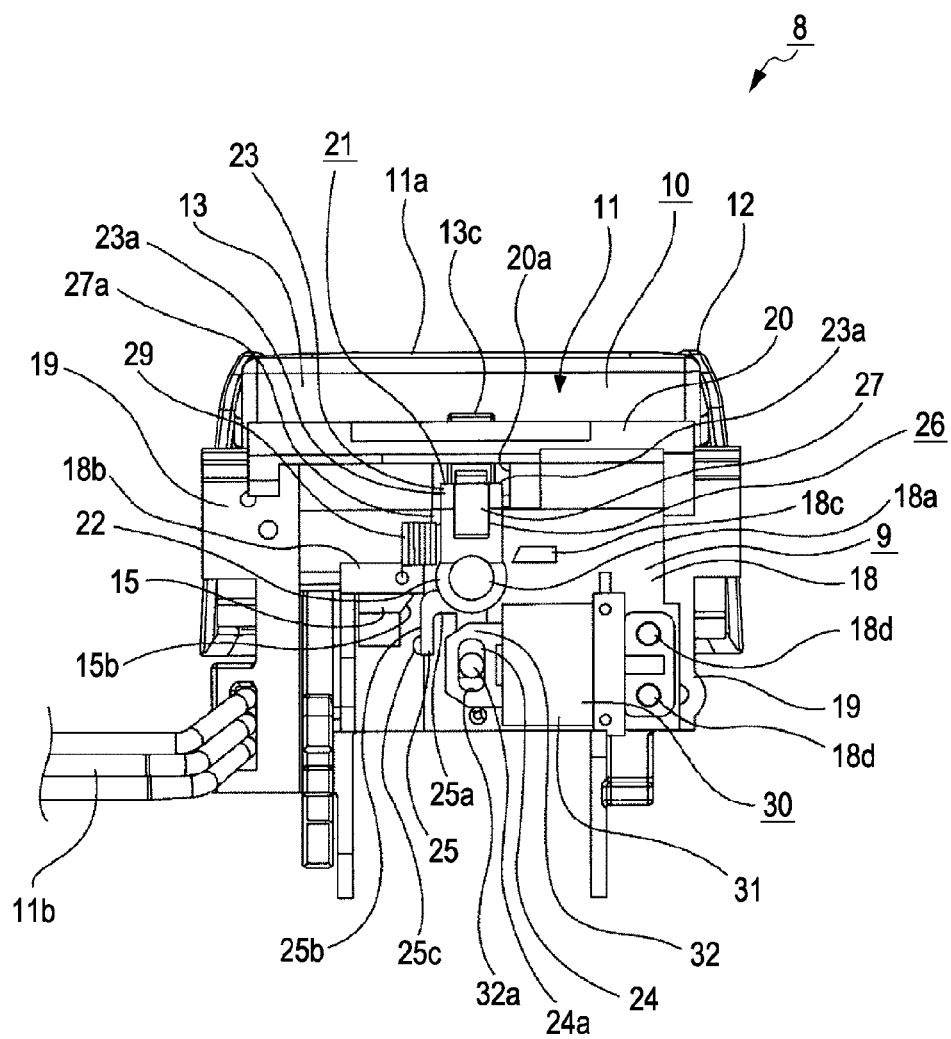
FIG. 15 is an enlarged bottom view that illustrates a state in which a mover rotates up to a projecting position.
Figure 16:
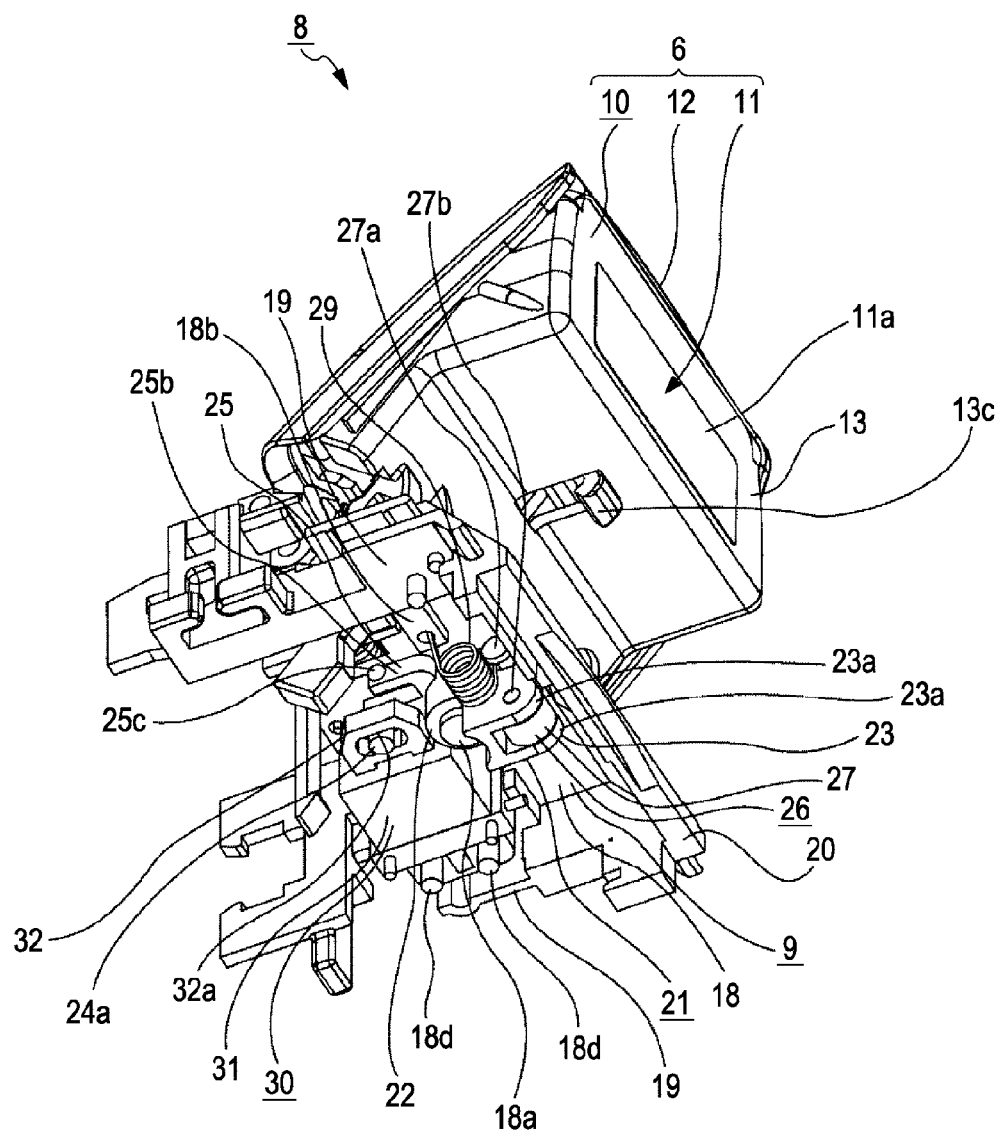
FIG. 16 is an enlarged perspective view that illustrates a state in which a mover rotates up to a projecting position.

Furthermore, when the mover 6 further rotates toward the projecting position, the sliding protrusion portion 25c of the cam sliding portion 25 further slides on the first cam surface 15a of the cam portion 15 toward the second cam surface 15b, and the sliding protrusion portion 25c is engaged with a consecutive portion of the first cam surface 15a and the second cam surface 15b (see FIGS. 13 and 14).

The moving base 21 rotates up to the lockable position. When the moving base 21 rotates up to the lockable position, the drive portion 32 of the plunger 30 is attracted into the main body 31, the drive portion 32 is adsorbed by the permanent magnet and the moving base 21 is held in the lockable position.

As described above, in the state in which the sliding protrusion portion 25c is engaged with the consecutive portion of the first cam surface 15a and the second cam surface 15b, the elastic deformation portion 25b of the cam sliding portion 25 is elastically deformed in a direction close to the connection protrusion portion 24.

In this manner, in the movement mechanism 8, when the moving base 21 rotates from the lock release position toward the lockable position, the elastic deformation portion 25b is elastically deformed in the direction close to the connection protrusion portion 24, and the pressing force is applied to the moving base 21 in a direction where it rotates from the lock release position toward the lockable position. Thus, it is possible to reliably rotate the moving base 21 up to the lockable position and reliably adsorb the drive portion 32 of the plunger 30, which is connected to the connection shaft 24a of the connection protrusion portion 24, to the permanent magnet.

When the mover 6 rotates further, the mover 6 is moved up to the projecting position. When the mover 6 is rotated up to the projecting position, the sliding protrusion portion 25c of the cam sliding portion 25 slides on the second cam surface 15b via the first cam surface 15a of the cam portion 15 and is continuously separated from the second cam surface 15b (see FIGS. 15 and 16). At this time, since the moving base 21 rotates up to the lockable position and the drive portion 32 is adsorbed to the permanent magnet in the plunger 30, the moving base 21 does not rotate anymore and is held in the lockable position, and the lock lever 16 is held in the lock position due to the pressing force of the spring member 29.

Since the sliding protrusion portion 25c is separated from the second cam surface 15b, the cam sliding portion 25 is elastically returned to the original position. Thus, when the moving base 21 rotates up to the lockable position, the elastic deformation portion 25b of the cam sliding portion 25 is elastically returned and is situated separately from the cam portion 15.

Next, the movement operation of the mover 6 from the projecting position to the receiving position will be described (see FIGS. 17 to 20).

Figure 17:
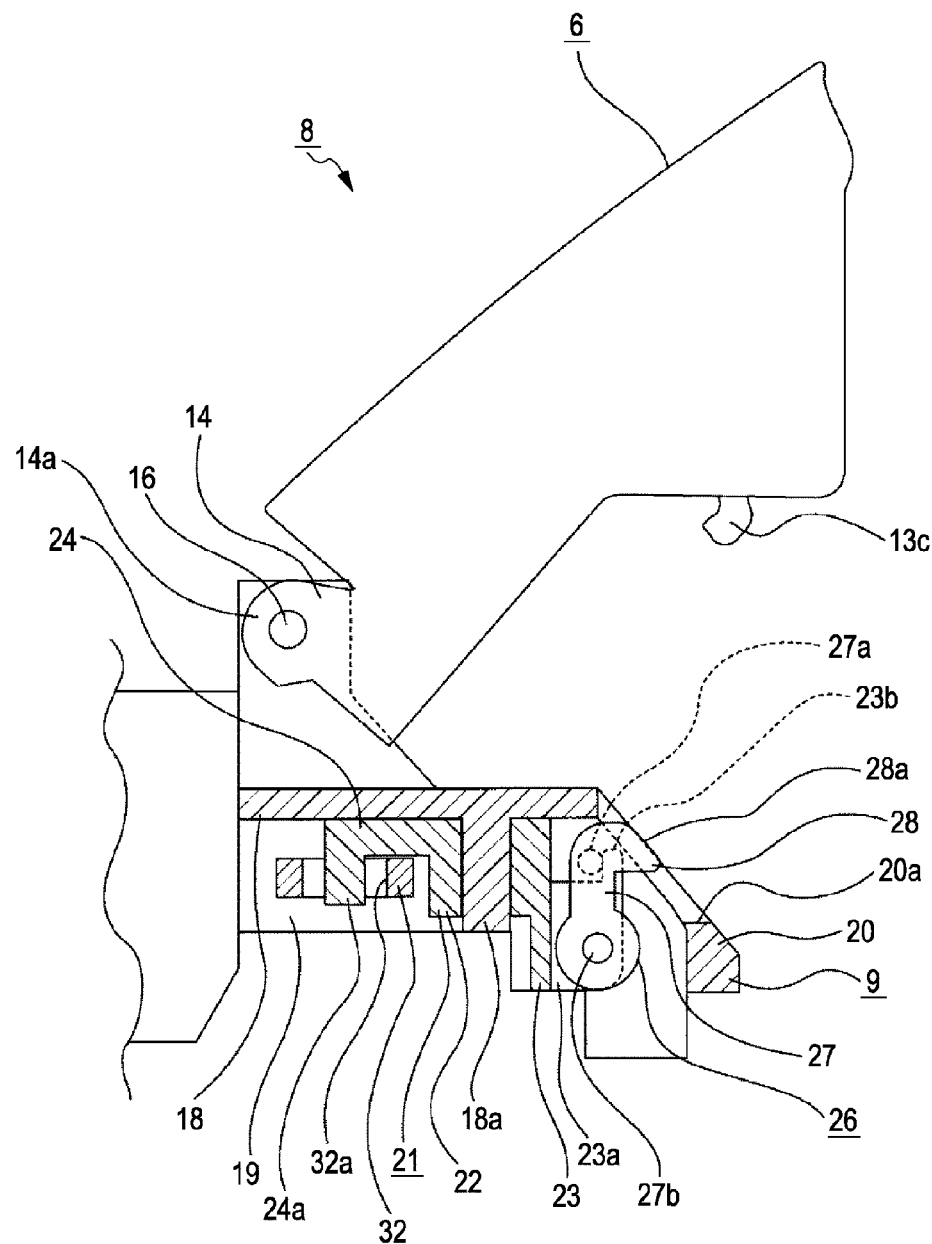
FIG. 17 is a schematically enlarged side view that illustrates a state in which a mover is held in a projecting position with a partial section.

When the mover 6 is manually pressed down, the mover 6 resists against the pressing force of the pressing spring 17 from the projecting position toward the receiving position and rotates (see FIG. 17). As described above, when the mover 6 is in the projecting position, the moving base 21 is held in the lockable position and the lock lever 26 is held in the lock position.

When the mover 6 rotates toward the receiving position, the locked portion 13c is inserted into the inserting opening 20a formed on the front surface portion 20 of the base body 9 and comes in contact with the inclined surface 28a formed on the engaging protrusion portion 28 of the lock lever 26 from the upper side thereof.

Figure 18:
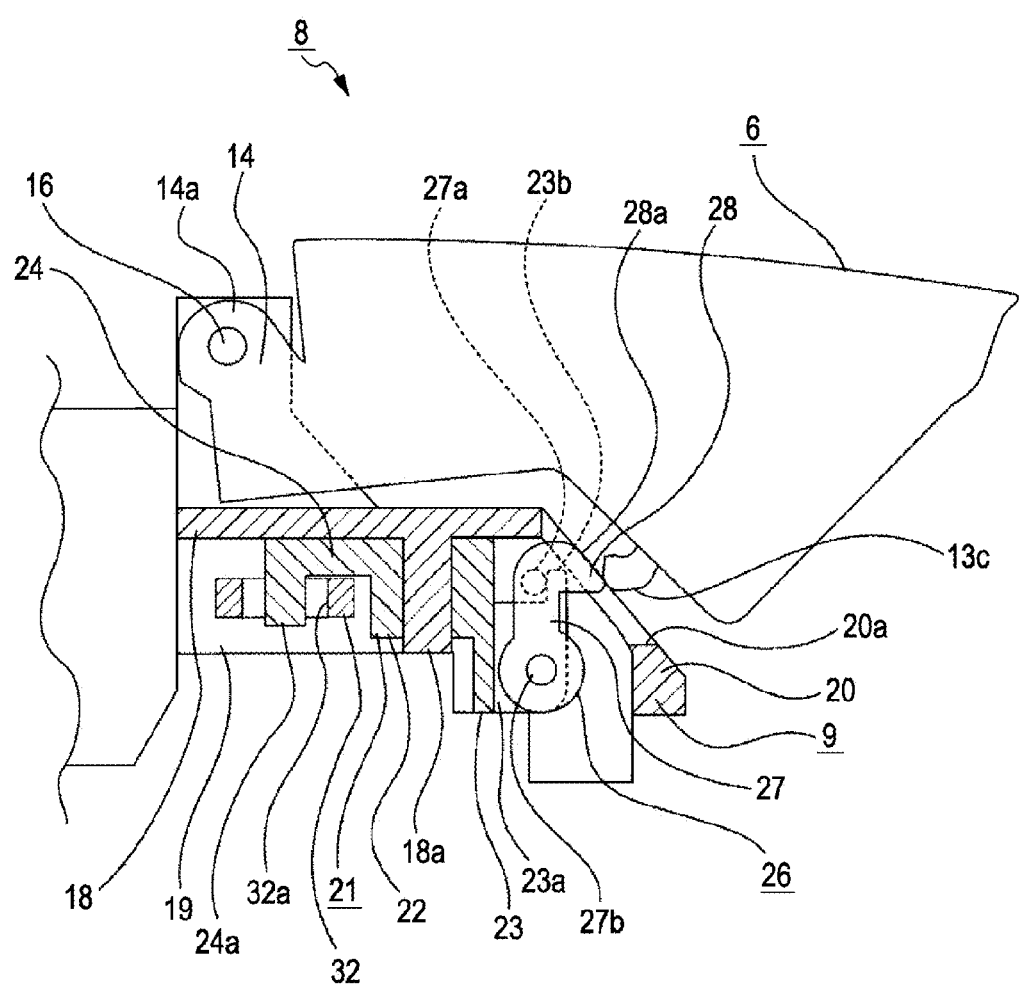
FIG. 18 is a schematically enlarged side view that illustrates a state in which a mover rotates from a projecting position toward a receiving position and a locked portion abuts on an inclined surface formed in an engaging protrusion portion of a lock lever with a partial section.

The locked portion 13c slides on the inclined surface 28a along with the rotation operation of the mover 6 toward the receiving position, and the lock lever 26 resists against the pressing force of the spring member 29 and rotates from the lock position toward the unlock position (see FIG. 18).

Figure 19:
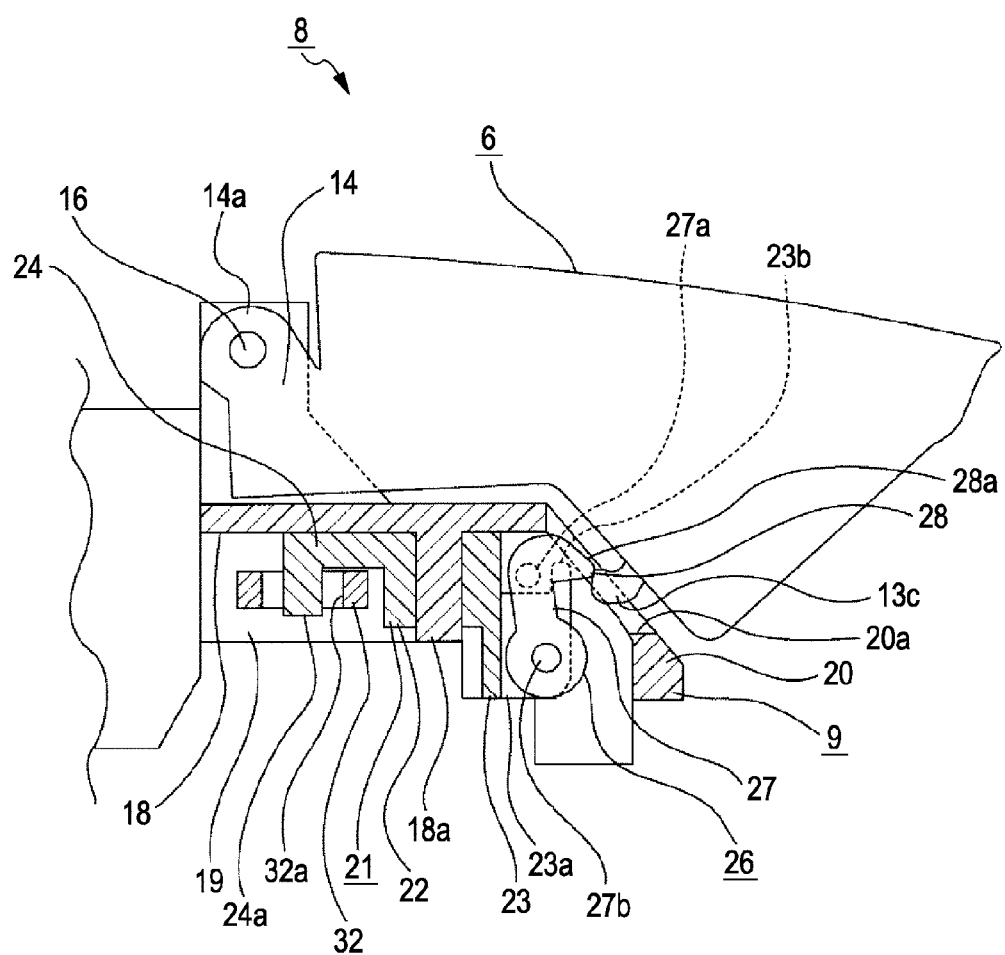
FIG. 19 is a schematically enlarged side view that illustrates a state in which a mover rotates from a projecting position toward a receiving position continuously from FIG. 18 and a locked portion abuts on a front end of an engaging protrusion portion of a lock lever with a partial section.
Figure 20:
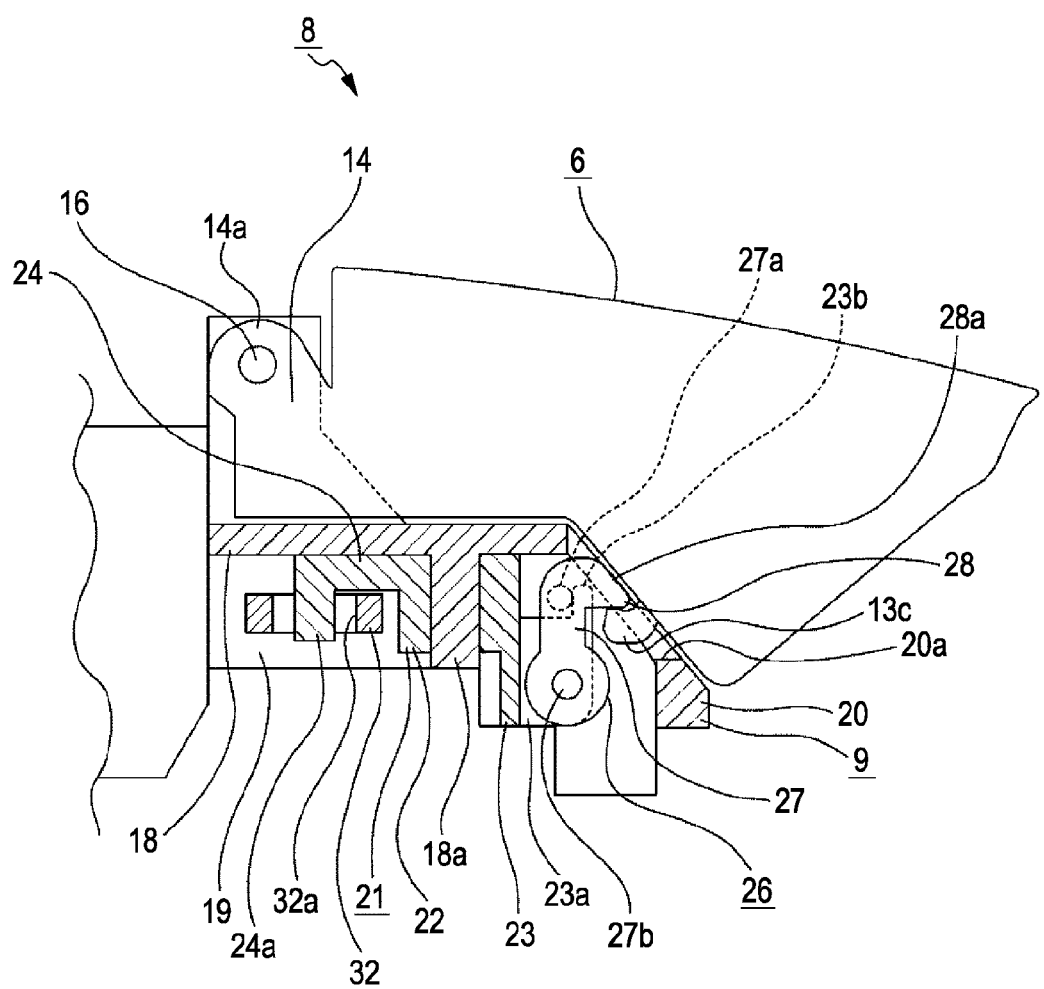
FIG. 20 is a schematically enlarged side view that illustrates a state in which a mover is locked in a receiving position with a partial section.

When the mover 6 further rotates toward the receiving position, the locked portion 13c is situated at the front side of the incline surface 28a of the engaging protrusion portion 28 (see FIG. 19). Thus, the further rotation of the mover 6 toward the receiving position makes the lock lever 26 rotate from the unlock position toward the lock position due to the pressing force of the spring member 29, the engaging protrusion portion 28 is engaged with the locked portion 13c from the upper side and the mover 6 is locked in the receiving position (see FIG. 20).

Furthermore, as described above, since in the lockable position, the cam sliding portion 25 is situated separately from the cam portion 15, when the mover 6 rotates from the projecting position toward the receiving position, the cam portion 15 does not contact the moving base 21.

Thus, in the rotation operation of the mover 6 from the projecting position toward the receiving position, it is possible to smoothly perform the rotation operation of the mover 6 from the projecting position toward the receiving position without applying unnecessary load to the mover 6 from the moving base 21.

CONCLUSION

As describe hereinabove, since in the imaging device 1, the movement direction (the first movement direction) of the mover 6 is approximately perpendicular to the movement direction (the second movement direction) of the moving base 21 for supporting the lock lever 26, the degree of positional accuracy of the mover 6 in the receiving position relative to the outer case 4 does not rely on the degree of dimensional accuracy of the plunger 30 for rotating the moving base 21.

Thus, it is possible to set the over stroke of the receiving position side in the movement stroke of the mover 6 in the first movement direction, whereby a gap is not generated between the mover 6 and the opening edge of the receiving concave portion 2a in the receiving position, and the occurrence of defects in the mover 6 relative to the outer case 4 can be prevented.

Furthermore, a high degree of dimensional accuracy of the component such as the plunger 30 is not necessary to reduce the gap between the mover 6 and the opening edge of the receiving concave portion 2a in the receiving position, and a reduction in manufacturing costs can be promoted accordingly.

In addition, since the gap is not generated between the mover 6 and the opening edge of the receiving concave portion 2a in the receiving position, the inflow of dust into the receiving concave portion 2a can be reduced.

Furthermore, since in the imaging device 1, the second movement direction of the moving base 21 can be made to be the rotation direction, the space that is necessary for the movement range of the moving base 21 can be reduced, which makes it possible to promote the size reduction of the imaging device 1.

Additionally, in the imaging device 1, the cam portion 15 is installed in the mover 6, so that when the mover 6 rotates from the receiving position toward the projecting position, the cam sliding portion 25 slides on the cam portion 15 and the moving base 21 rotates from the lock release position up to the lockable position.

Thus, it is possible to rapidly perform the rotation operation of the mover 6 from the projecting position to the receiving position without having to perform an operation that rotates the moving base 21 from the lock release position up to the lockable position in a state in which the mover 6 moves to the projecting position.

Furthermore, since there is no necessity for a dedicated mechanism for performing the rotation operation of the mover 6 from the projecting position to the receiving position, it is possible to promote a reduction in the number of components and the simplification of the mechanism.

Additionally, while there has been described an example in which both of the mover 6 and the moving base 21 rotate, the movement direction of the mover 6 and the moving base 21 may be a linear direction, and, for example, the mover 6 may move in the up and down direction and the moving base 21 may move in the front and rear direction or the left and right direction.

In addition, while there has been described an example in which the light emitting unit 11 with a flash is installed in the mover 6, the mover is not limited to a mover 6 with a light emitting unit but may be a mover having an imaging lens, display unit, operation unit, a connection terminal unit such as a connector and recoding medium such as a recording disc and a memory card.

Specific shapes and structures of each portion described in the above-mentioned most desirable embodiment merely describe a specific example when implementing the present invention and the technical scope of the present invention should not be limitedly interpreted thereby.

The present application contains subject matter related to that disclosed in Japanese Priority Patent Application JP 2009-160138 filed in the Japan patent Office on Jul. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A movement mechanism comprising:
    a base body disposed in an inner part of an outer case of an imaging device;
    a mover that is movable in a first movement direction with respect to the base body between a receiving position where the mover is received in a receiving concave portion formed in the outer case and a projecting position where the mover protrudes outward from the outer case, and has a locked portion;
    a pressing spring to press the mover from the receiving position toward the projecting position;
    a moving base capable of moving in a second movement direction between a lockable position to the base body and a lock release position;
    a lock lever that is supported by the moving base and can move rotatably between a lock position and an unlock position, can move integrally with the moving base in the second movement direction, and is engaged with the locked portion of the mover when the mover is moved to the receiving position, the moving base moves to the lockable position, and the lock lever moves to the lock position, so as to lock the mover; and a driver that is connected to the moving base and is a drive source for moving the moving base in the second movement direction, wherein when the moving base moves from the lockable position to the lock release position, an engagement of the lock lever and the locked portion of the mover is released and the mover moves from the receiving position to the projecting position due to pressing force of the pressing spring, wherein the first movement direction of the mover is approximately perpendicular to the second movement direction of the moving base, wherein a cam sliding portion is installed in the moving base, and wherein a cam portion is installed in the mover such that, when the mover moves from the receiving position toward the projecting position, the cam portion slides with the cam sliding portion and moves the moving base from the lock release position to the lockable position, wherein in the cam sliding portion of the moving base, an elastic deformation portion capable of being elastically deformed in a direction toward or away from the cam portion is installed, and wherein when the mover moves from the receiving position toward the projecting position, the elastic deformation portion of the cam sliding portion is elastically deformed in a direction where a pressing force is applied to the moving base in a movement direction from the lock release position to the lockable position.

2. The movement mechanism according to claim 1, wherein the moving base is rotatably supported by the base body, and wherein the second movement direction of the moving base is made to be a rotation direction.

3. The movement mechanism according to claim 1, wherein when the moving base moves to the lockable position, the cam sliding portion is separated from the cam portion.

4. The movement mechanism according to claim 1, wherein a spring member is installed which presses the moving base from the lockable position toward the lock release position and presses the lock lever from the unlock position toward the lock position.

\* \* \* \* \*